(12) United States Patent
Renz et al.

(10) Patent No.: US 7,572,843 B2
(45) Date of Patent: Aug. 11, 2009

(54) POLY(VINYLALCOHOL)-CO-POLY(VINYLAMINE)POLYMERS COMPRISING FUNCTIONAL MOIETIES

(75) Inventors: Walter L. Renz, Brookfield, CT (US); Ramanathan Ravichandran, Suffern, NY (US); Andrew J. Naisby, Yorktown Heights, NY (US); Joseph Suhadolnik, Yorktown Heights, NY (US); Mervin Gale Wood, Mobile, AL (US); Rong Xiong, Dobbs Ferry, NY (US)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 604 days.

(21) Appl. No.: 10/499,855

(22) PCT Filed: Dec. 16, 2002

(86) PCT No.: PCT/EP02/14321

§ 371 (c)(1),
(2), (4) Date: Jun. 21, 2004

(87) PCT Pub. No.: WO03/054030

PCT Pub. Date: Jul. 3, 2003

(65) Prior Publication Data
US 2005/0020729 A1 Jan. 27, 2005

Related U.S. Application Data

(60) Provisional application No. 60/420,439, filed on Oct. 22, 2002, provisional application No. 60/342,324, filed on Dec. 21, 2001.

(51) Int. Cl.
*B32B 5/16* (2006.01)
(52) U.S. Cl. .................. 523/160; 428/334; 428/328; 428/32.34
(58) Field of Classification Search .................. 523/160
See application file for complete search history.

(56) References Cited

U.S. PATENT DOCUMENTS

| | | | |
|---|---|---|---|
| 4,503,111 A | 3/1985 | Jaeger et al. | 428/195 |
| 4,575,465 A | 3/1986 | Viola | 427/261 |
| 4,617,239 A | 10/1986 | Maruyama et al. | 428/452 |
| 4,880,497 A | 11/1989 | Pfohl et al. | 162/135 |
| 4,895,828 A | 1/1990 | Yaguchi et al. | 503/226 |
| 4,935,307 A | 6/1990 | Iqbal et al. | 428/500 |
| 4,978,427 A | 12/1990 | Pfohl et al. | 162/168.2 |
| 5,194,492 A | 3/1993 | Pinschmidt, Jr. et al. | 525/60 |
| 5,206,071 A | 4/1993 | Atherton et al. | 428/195 |
| 5,300,566 A | 4/1994 | Pinschmidt, Jr. et al. | 525/60 |
| 5,428,112 A | 6/1995 | Ahlers et al. | 525/326.7 |
| 5,430,110 A | 7/1995 | Ahlers et al. | 525/328.2 |
| 5,463,110 A | 10/1995 | Chen et al. | 560/172 |
| 5,662,997 A | 9/1997 | Onishi et al. | 428/331 |
| 5,672,731 A | 9/1997 | Chen et al. | 560/172 |
| 5,710,211 A | 1/1998 | Sato et al. | 525/62 |
| 5,798,173 A | 8/1998 | Momma et al. | 428/342 |
| 6,060,566 A | 5/2000 | Denzinger et al. | 525/455 |
| 6,086,985 A * | 7/2000 | Shaw-Klein et al. | 428/304.4 |
| 6,096,826 A * | 8/2000 | Rabasco et al. | 525/61 |
| 6,127,037 A | 10/2000 | Sargeant et al. | 428/411.1 |
| 6,146,497 A * | 11/2000 | Nguyen | 162/158 |
| 6,485,609 B1 * | 11/2002 | Boylan | 162/135 |

FOREIGN PATENT DOCUMENTS

| | | |
|---|---|---|
| EP | 0339371 | 11/1989 |
| EP | 0580078 | 1/1994 |
| EP | 0580079 | 1/1994 |
| EP | 0869010 | 10/1998 |
| WO | 00/37259 | 6/2000 |
| WO | 03/037641 | 5/2003 |
| WO | 03/054029 | 7/2003 |

OTHER PUBLICATIONS

Patent Abstracts of Japan Publication No. 10016381 (1998).
Patent Abstracts of Japan Publication No. 10016380 (1998).
TAPPI Journal, Jan. 1997, pp. 68-70.
English language abstract of JP 9302595 (1997).
English language abstract of JP 11129609 (1999).

(Continued)

*Primary Examiner*—Katarzyna Wyrozebski
(74) *Attorney, Agent, or Firm*—Tyler A. Stevenson

(57) ABSTRACT

The invention relates to poly(vinylalcohol)-co-poly(vinylamine) copolymers represented as formula (I), where B is greater than or equal to 1, L is independently of each other a chemical linking group which is —NH—, —N═, >N—, >N⁺+<, —O— or —CO—, COPOLYMER is derived from a prepolymer of the formula (II) where $R_1$ and $R_3$ are independently H; 3-propionic acid or $C_1$-$C_6$ alkyl ester thereof; or is 2-methyl-3-propionic acid or $C_1$-$C_6$ alkyl ester thereof, $R_2$ and $R_4$ are independently H or $C_1$-$C_6$ alkyl, x+y+z is between about 3 and about 50 mole percent and q, n and m together make up the remainder of the mole percent, the indices x, y, z, n, m -and q independently may be 0, if q is not 0, b may also be 0.

(I)

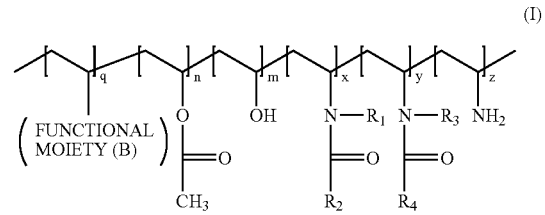

19 Claims, No Drawings

OTHER PUBLICATIONS

English language abstract of JP 2002220558 (2002).
English language abstract of JP 7084091 (1995).
English language abstract of JP 1024784 (1989).
Ciba Specialty Chemicals Corp., U.S. Appl. No. 10/887,201 (Jul. 2004).
Ciba Specialty Chemicals Corp., U.S. Appl. No. 10/890,449 (Jul. 2004).
Derwent Abstr. 1993-383267 [48] for JP 5287233 (1993).
Patent Abstracts of Japan Publication No. 04304215, Oct. 27, 1992.

* cited by examiner

POLY(VINYLALCOHOL)-CO-POLY(VINYLAMINE)POLYMERS COMPRISING FUNCTIONAL MOIETIES

This is a national stage of international app. No. PCT/EP02/14321, filed Dec. 16, 2002, which claims benefit of U.S. provisional app. Nos. 60/420,439, filed Oct. 22, 2002 and 60/342,324, filed Dec. 21, 2001, the disclosures of which are incorporated by reference.

This invention relates to poly(vinylalcohol)-co-poly(vinylamine) copolymers and derivatives thereof that are chemically bound to functional moieties, in particular to functional moieties that improve the performance of said copolymers in recording media.

The invention also relates to compositions comprising the functional moiety-containing copolymers. In particular, the compositions are ink jet recording media.

Ink jet printing technology is used for example for presentation (transparency), graphic arts, engineering drawing and home office applications. The performance requirements for ink jet recording media used for these applications include efficient ink absorption, fast drying, good colorfastness, high image resolution, dimensional stability and archival stability of the printed image against the effects of light, atmospheric pollutants and humidity.

The individual layers that receive ink jet ink images are referred to as ink jet media or ink jet receivers. Ink jet media may simply consist or cellulosic fiber paper or of cellulosic fibers and a filler in order that inks may be absorbed in the space between fibers.

Ink jet recording papers may also be of the coated type, which consists for example of a paper (or support), an ink-receptive layer or ink-absorbing layer or layers, and optionally a protective coating layer. The ink-receptive layer is the ink-receiving or image drying layer. Thin protective coating layers are typically employed to provide physical protection for the underlying layer or to protect the image. Protective layers may reduce tackiness, provide a glossy appearance, and like other layers, offer an ink-receptive surface that may serve as a carrier for specific components of the ink.

A barrier layer between a paper support and the ink receptive layer or layers is also typically employed.

Attempts have been made to employ certain polymers or blends of polymers as components of ink jet recording media. In general, blends are used to find the proper balance of ink absorption, dry time and image permanence.

Polymers based on vinyl alcohol are commonly used in ink jet recording media because of their hydrophilic nature, contribution to high print densities, good pigment binding properties, favorable rheological properties and synergy with additives such as optical brighteners. The use of fully and partially saponified poly(vinyl alcohol)s in paper coatings for ink jet printing media are described in *Using Polyvinyl Alcohol In Ink-Jet Printing Paper* (*TAPPI Journal*, January 1997, pp. 68-70).

Polymers based on vinyl alcohol are employed in each of the two major classes of ink receptive layers: the so-called dense polymer systems containing polymer with no or very low levels of pigmention (generally <5 wt. %), and the so-called microporous and nanoporous receptive layers in which polymers are blended with relatively high levels (ca. 25-90 wt. %) of inorganic pigments such as kaolin, silicas, calcium carbonate, alumina, boehmites, etc. Dense polymer receiver coatings generally provide good image permanence in terms of lightfastness and resistance to image fading caused by atmospheric gases (e.g. ozone, NOx, SOx), but suffer from relatively slow ink dry speed and poor water/humidity resistance of the printed image. Nanoporous and microporous media provide significantly faster ink drying speed and moisture resistance, but produce images that are more vulnerable to the effects of light and atmospheric gases when printed with dye-based ink jet inks.

Polymers of poly(vinyl alcohol) containing cationic, anionic, non-ionic and various reactive modifications for use in recording media are described in U.S. Pat. Nos. 4,617,239, 5,662,997, 5,710,211 and several references below, which also give representative examples of ink jet recieving layer compositions.

U.S. Pat. No. 4,503,111 teaches a recording media which is a coating that comprises a polyvinylpyrrolidone and a matrix-forming hydrophilic polymer selected from gelatin and polyvinyl alcohol.

U.S. Pat. No. 4,575,465 discloses ink jet transparencies that comprise a transparent support carrying a layer comprising a vinylpyridine/vinylbenzyl quaternary salt copolymer and a hydrophilic polymer selected from gelatin, polyvinyl alcohol and hydroxypropyl cellulose.

U.S. Pat. No. 4,935,307 discloses an ink receptive layer that comprises (a) at least one water absorbing, hydrophilic polymeric material, (b) at least one hydrophobic polymeric material incorporating acid functional groups and (c) at least one polyethylene glycol.

U.S. Pat. No. 5,206,071 teaches an ink jet film composite comprising a support, a water-insoluble, water-absorptive and ink-receptive matrix layer, which matrix layer comprises a hydrogel complex and a polymeric high molecular weight quaternary ammonium salt.

U.S. Pat. No. 6,127,037 teaches an ink jet recording media layer that comprises polyalkyl or polyphenyl oxazoline polymers in addition to a hydrophilic, water-insoluble polymer or copolymer.

WO 0037259 teaches ink jet media comprising a support, an ink-receptive layer and a top layer that comprises a polymer that contains both a hydrophilic component and a hydrophobic component, or a mixture of two or more such polymers.

U.S. Pat. Nos. 4,880,497 and 4,978,427 teach a process for making paper that employs polymers made by copolymerizing from 10-90 mole % N-vinylformamide with a second unsaturated monomer, including vinyl acetate, and in a second step, hydrolyzing the resulting suspension copolymer with acid or base to the extent that between 30 and 100 mole % of the formyl groups are converted to amino groups. The resulting cationic solution polymers may contain significant amounts of vinyl alcohol functionality in addition to vinylamine units. As taught in example preparations, these aqueous solution polymers also contain significant quantities of soluble acids or acid salts (e.g. formate and acetate) as coproducts of the hydrolysis step. The unpurified reaction mass (aqueous copolymer and hydrolysis coproducts) are recommended for use as wet and dry strength agents for addition to paper stock suspensions.

U.S. Pat. Nos. 5,194,492 and 5,300,566 teach an improved method and process for producing poly(vinyl alcohol-co-vinylamine) via a two-phase process in which a predominantly random linear copolymer of vinyl acetate and N-vinylformamide is prepared in methanol solution and then saponified with a catalytic amount of base to yield a solid salt-free intermediate of poly(vinyl alcohol-co-N-vinylformamide) which is subsequently hydrolyzed in a slurry reaction with base to give the desired poly(vinyl alcohol-co-vinylamine) free base copolymer as a solid, salt-free material.

EP 0869010 describes ink jet receiving layers containing a copolymer of vinyl alcohol and a primary or secondary vinylamine moiety. Such materials are prepared by copolymerization of vinyl acetate and N-vinyl-t-butylcarbamate, or vinyl acetate and an N-vinylamide, followed by hydrolysis to yield the preferred poly(vinyl alcohol-co-vinylamine). Ink receptive coatings containg these cationic copolymers are reported to have excellent printing and lightfastness properties with ink jet printers.

U.S. Pat. No. 6,060,566 describes graft copolymers produced by polymerization of N-vinylformamide in the presence of poly(vinyl alcohol) or a poly(vinyl alcohol-co-vinyl ester) copolymer, with subsequent elimination of 1-100% of the formyl groups on the grafted poly(N-vinylformamide) chains. The resulting solution polymers, which also may contain soluble coproducts of the hydrolysis step (i.e. formic acid or its salts, with or without acetic acid and its salts) are recommended for use in the production of uncoated paper and paperboard as dry and wet strength resins, retention aids, size promoters, dispersants, and creping assistants.

U.S. Pat. No. 5,798,173 describes ink jet recording sheets containing copolymers obtained by the polymerization of N-vinylformamide with acrylonitrile, followed by hydrolysis of the vinylformamide residues to yield a vinylamine copolymer having at least 20 mole % vinylamine content.

JP01024784 and JP07084091 describe ink jet recording sheets having a coating containing a poly(N-vinylformamide) or its partial hydrolyzate [i.e. poly(N-vinylformamide-co-vinylamine)].

JP09302595 discloses papermaking agents, particularly sizes and coatings for ink jet recording papers, comprising graft copolymers of vinyl alcohol and N-vinylformamide which are hydrolyzed with acid (e.g. ammonium chloride and HCl) and then precipitated by addition into acetone to yield a solid vinylamine copolymer acid salt.

JP11129609 describes a material for ink jet printing comprising a support and an ink receiving layer containing a copolymer comprising N-vinylformamide and at least one monomer drawn from a group including N-vinylamides, selected acrylamides, and vinyl acetate.

U.S. Pat. No. 6,096,826 teaches the use of piperidone modified poly(vinyl alcohol) in ink jet paper coating applications.

U.S. Pat. Nos. 5,463,110 and 5,672,731 describe compositions and methods for preparation of unsaturated 3-N-vinylformamido propionate esters and 3-N-vinylformamido-2-methyl propionate esters obtained by the Michael Addition of N-vinylformamide with (meth)acrylic acid esters. These novel N-vinyl monomers may be polymerized via free radical addition polymerizations to yield functionalized poly(N-vinylformamide) homopolymers and copolymers.

JP 2002220558 discloses recording liquid which contains a water soluble resin which includes nonionic structural units and ionic structural units.

There is still a need to balance the requirements of ink jet media, specifically, to achieve ink jet media that provide excellent image quality and printing characteristics while providing improved image permanence against the harmful effects of light and/or atmospheric pollutants.

This objective has been achieved with the use of certain vinyl alcohol copolymers in one or more layers of ink jet media.

The present invention relates to poly(vinylalcohol)-co-poly(vinylamine) copolymers (PVOH/PVAm copolymers) and derivatives thereof that are chemically bound to functional moieties.

The present functional moiety-containing PVOH/PVAm copolymers are represented as

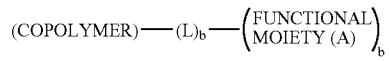

where
b is greater than or equal to 1,
L is independently of each other a chemical linking group which is —NH—, —N=, >N—, >N$^+$<, —O— or —CO—,
COPOLYMER is derived from a prepolymer of the formula

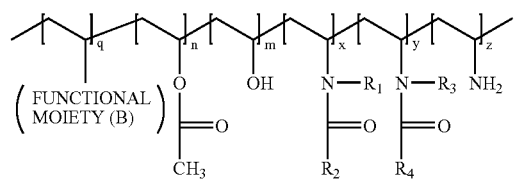

where
$R_1$ and $R_3$ are independently H; 3-propionic acid or $C_1$-$C_6$ alkyl ester thereof; or is 2-methyl-3-propionic acid or $C_1$-$C_6$ alkyl ester thereof,
$R_2$ and $R_4$ are independently H or $C_1$-$C_6$ alkyl,
x+y+z is between about 3 and about 50 mole percent and
q, n and m together make up the remainder of the mole percent,
the indices x, y, z, n, m and q independently may be 0,
if q is not 0, b may also be 0, and where
FUNCTIONAL MOIETY (A) is derived from at least one functional moiety-containing compound, which compounds contain at least one functional moiety selected from the group consisting of the light stabilizer, crosslinking-agent, polymer modifier, anti-gas fade, dye fixative, compatibilizer, buffer and glycol solubilizer moieties and where

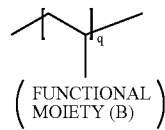

is derived from at least one ethylenically unsaturated functional moiety-containing compound, which compounds contain at least one functional moiety selected from the group consisting of the light stabilizer, crosslinking-agent, polymer modifier, anti-gas fade, dye fixative, compatibilizer, buffer and glycol solubilizer moieties.

Alkyl is straight or branched chain and is for example methyl, ethyl, n-propyl, isopropyl, n-butyl, sec-butyl, tert-butyl, amyl, iso-amyl, tert-amyl and n-hexyl.

The linking group L is selected from —NH—, —N=, >N—, >N$^+$<, —O— and —CO—, and is derived from the amine, amide, alcohol and acid or ester groups of the prepolymer.

The FUNCTIONAL MOIETY (A) is independently derived from known functional moiety-containing compounds, for example from known light stabilizers, crosslinkers, crosslinking-agents, polymer modifiers, anti-gas fade compounds, dye fixatives, compatibilizers, buffers and glycol solubilizers. The present copolymers may contain one or more than one of said moieties.

The FUNCTIONAL MOIETY (B) likewise is a molecular group containing at least one functional moiety selected from the group consisting of the known light stabilizer, crosslinker, crosslinking-agent, polymer modifier, anti-gas fade, dye fixative, compatibilizer, buffer and glycol solubilizer moieties.

The term "derived from" means "formed from". For example, the prepolymer and the functional moiety-containing compound or compounds are less the requisite groups necessary to form the linking group L to form the present copolymers. That is to say the present copolymers are for example derived from PVOH/PVAm prepolymers and functional moiety-containing compounds.

The groups

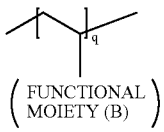

are also "derived", that is derived from ethylenically unsaturated functional moiety-containing compounds.

The term "prepolymer" in this invention has no meaning other than the present copolymers are derived therefrom.

There is direct overlap of the "moieties" of FUNCTIONAL MOIETY (A) and FUNCTIONAL MOIETY (B). The (A) groups are bound to the present copolymers through reactions with the finished prepolymer or by reaction with prepolymer monomers followed by polymerization. The (B) groups are bound to the present copolymers via free radical polymerization through functional moiety-containing ethylenically unsaturated monomers.

As understood in the art, the term "moiety" means a structural group having a desired function. That is, an ultraviolet light absorber moiety is a functional group having suitable ultraviolet light absorbing characteristics. A dye fixative moiety is a functional group having suitable dye fixative characteristics and so on. Compounds containing such moieties are known to those skilled in the art.

The prepolymer and the moiety-containing compounds may be reacted to form the present copolymers.

The present copolymers are prepared for example by nucleophilic displacement reactions or by condensation reactions or by Michael addition reactions of the prepolymer with functional moiety-containing compounds. For example, the reactive alcohol or amine groups of the prepolymer are suitable nucleophiles for reacting with suitable electrophilic-group containing functional moiety-containing compounds. For example, Michael reactions may be performed between a nucleophile of a prepolymer and an acrylate-containing functional moiety-containing compound. Likewise, a nucleophilic moiety-containing compound may react with an ester group of a prepolymer.

Condensation reactions of course include epoxide reactions, acid chloride reactions, as well as reactions with anhydrides, ketals and acetals.

Functional moieties may be incorporated into the present copolymers either by reacting a suitable functional moiety-containing compound with a finished prepolymer or, alternatively, functional moieties may be incorporated into suitable monomers which are subsequently polymerized to be part of a finished copolymer.

Further, and as is apparent from the present copolymer formula, the functional moiety may be bonded to the copolymer via free-radical polymerization. Suitable moiety containing compounds for this purpose are the appropriate ethylenically unsaturated monomer compounds containing said moiety.

The free amine groups of PVOH/PVAm prepolymer are the most reactive sites. For example, each of the free amines may be reacted with a functional moiety-containing compound, or likewise, a portion of the free amines may be reacted with a functional moiety-containing compound. This is true also of the other reactive groups of the prepolymer (or of the prepolymer monomers).

Of course, different functional moiety-containing compounds may be reacted with the prepolymer or prepolymer monomers. This would allow for introduction of different advantageous properties into one PVOH/PVAm copolymer.

The copolymers of this invention are random or block copolymers.

The present prepolymers are prepared for example from the complete or partial hydrolysis of poly(vinyl acetate)-co-poly(N-vinyl formamide) copolymers. The partial hydrolysis of these polymers is described in U.S. Pat. Nos. 5,300,566 and 5,194,492, the relevant parts of which are hereby incorporated by reference. Complete hydrolysis to a poly(vinylalcohol)-co-poly(vinylamine) copolymer simply involves extending the hydrolysis conditions.

The copolymers of the present invention have for example a weight average molecular weight $M_w$ of between about 10,000 and about 300,000.

The present light stabilizer moieties are for example ultraviolet light absorbing or hindered amine light stabilizer moieties.

The present ultraviolet stabilizer moieties are derived from ultraviolet stabilizers selected from the group consisting of hydroxybenzophenone, hydroxyphenylbenzotriazole, hydroxyphenyltriazine, a-cyanoacrylates, malonates, salicylates, oxanilides and benzoates.

Hydroxyphenylbenzotriazole moiety-containing compounds are disclosed for example in U.S. Pat. Nos. 3,004,896; 3,055,896; 3,072,585; 3,074,910; 3,189,615; 3,218,332; 3,230,194; 4,127,586; 4,226,763; 4,275,004; 4,278,589; 4,315,848; 4,347,180; 4,383,863; 4,675,352; 4,681,905, 4,853,471; 5,268,450; 5,278,314; 5,280,124; 5,319,091; 5,410,071; 5,436,349; 5,516,914; 5,554,760; 5,563,242; 5,574,166; 5,607,987, 5,977,219, 6,166,218 and 6,262,151, the relevant parts of which are hereby incorporated by reference.

Hydroxyphenyltriazine moiety-containing compounds are disclosed for example in U.S. Pat. Nos. 3,843,371; 4,619,956; 4,740,542; 5,096,489; 5,106,891; 5,298,067; 5,300,414; 5,354,794; 5,461,151; 5,476,937; 5,489,503; 5,543,518; 5,556,973; 5,597,854; 5,681,955; 5,726,309; 5,942,626; 5,959,008; 5,998,116 and 6,013,704, and U.S. application Ser. No. 09/383,163, the relevant parts of which are hereby incorporated by reference.

The hindered amine moiety-containing compounds are disclosed for example in U.S. application Ser. Nos. 09/257, 711, 09/505,529 and 09/794,710, and U.S. Pat. Nos. 5,204, 473, 5,096,950, 5,004,770, 5,844,026, 6,046,304, 6,166,212, 6,117,995, 6,221,937 and 6,271,377, the relevant parts of which are hereby incorporated by reference. The amine of the hindered amine may be substituted by groups known in the art, for example methyl, hydrogen, acyl, hydroxyl, oxyl, alkoxy or cycloalkoxy or hydroxyalkoxy.

Hydroxylalkoxy hindered amines are disclosed for example in U.S. Pat. No. 6,271,377.

Hindered-amine moiety-containing compounds of the present invention include for example piperidine, imidazolidinone, piperazinone, piperazindione, morpholinone and oxazolidinone hindered amine moieties.

The sterically hindered amine moiety is for example selected from the group consisting of

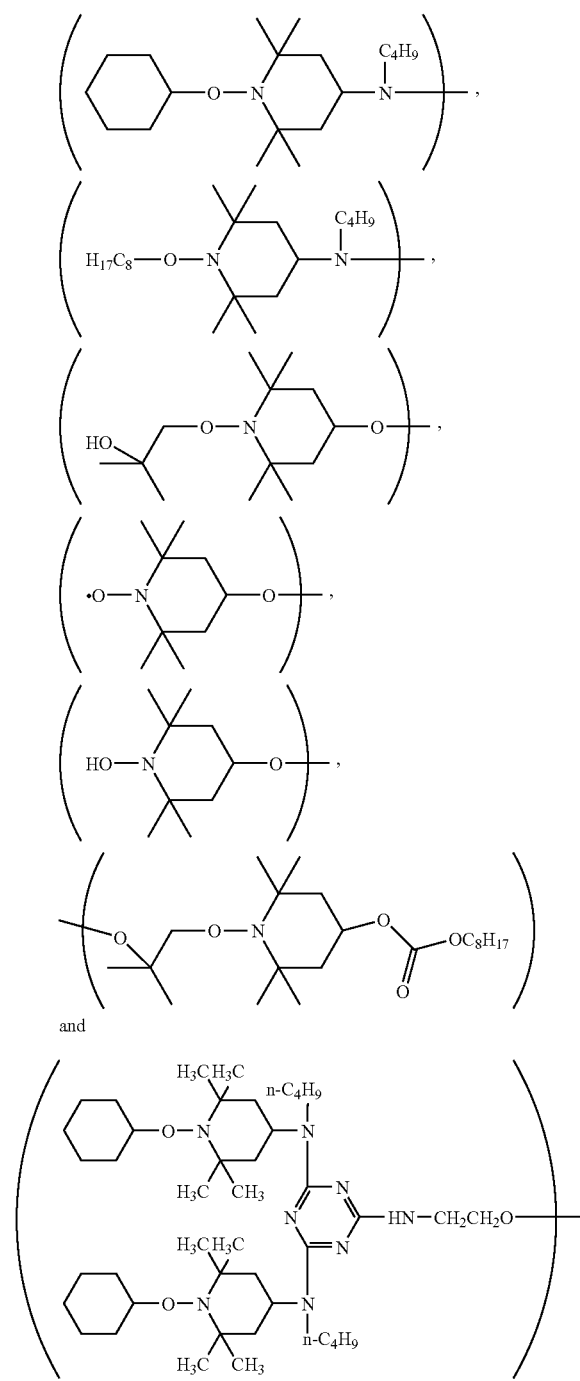

and

The present ultraviolet absorber moieties are for example hydroxyphenylbenzotriazole moieties selected from

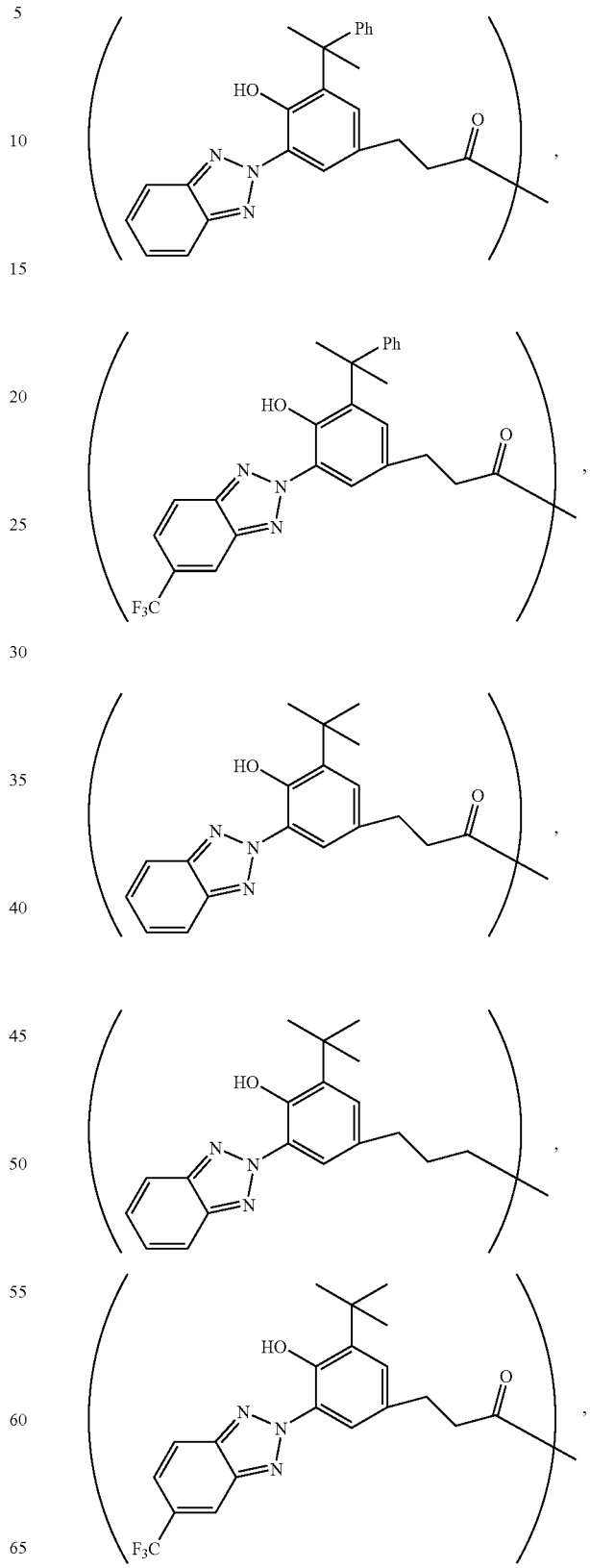

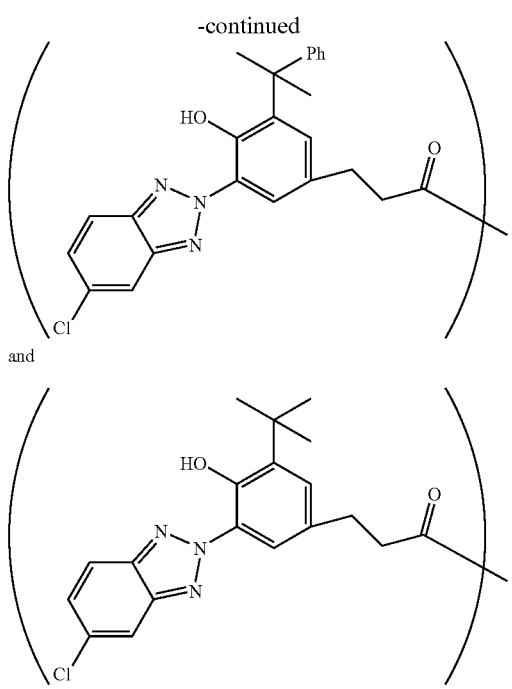

Acrylate containing stabilizers may be incorporated into the present copolymers during the polymerization stage, for example the following acrylate containing compounds:

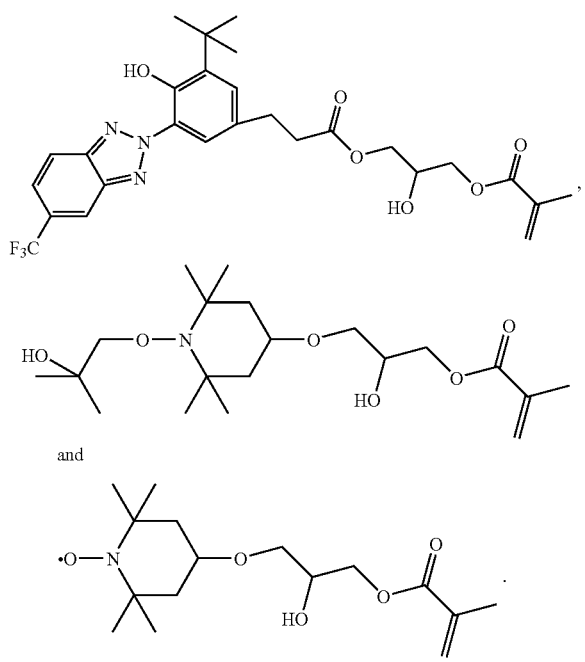

These are examples where the FUNCTIONAL MOIETY (B) may be attached to the backbone of a present copolymer via free radical polymerization.

Likewise, such acrylate containing compounds may be reacted with the finished PVOH/PVAm prepolymer under Michael addition conditions.

The crosslinking-agent moieties are functional groups that contain known crosslinker moieties or are groups that may react with known crosslinkers. A known crosslinker is for example isocaynate. Present crosslinking-agent moieties are for example HEMA, polyol-polyacrylates, aliphatic alcohols and aliphatic amines, glyoxal, polyols, polyamines, iso-cyanate, melamine, phenol, novolac, polyester, epoxy, vinyl ester, urethane, urea, glycidyl, acrylate, oxazolidine, aziridine, vinyl acrylic, acetylene-terminated polyimide, polyphenylene quinoxoline, diaryl acetylene, polyimide, cyanate, nitrile, halogenated hydrocarbon and silicone moieties.

The polymer modifier moieties are for example imine and aminal moieties. Polymer modifiers are for example hardeners, plasticizers, TGA modifiers, morphology modifiers, pH modifiers and rheology modifiers.

The anti-gas fade moieties are for example organic sulfur, mercaptan, arylthiol, thio-carbonyl, hydroxylamine and amine oxide moieties.

The dye fixative moieties are for example quaternary amine, amine salt, polyamine, oligomer and metal salt moieties.

The compatibilizer moieties are for example polyol, polyether, alkanoyl and benzoyl moieties.

The buffer moieties are for example benzoate salt, phosphonate salt, phosphate salt and acetate salt moieties. For example, benzoic acid substituted with ethylenically un-saturated groups are suitable functional-moiety containing compounds that may introduce present buffer moieties.

The glycol solubilizer moieties are for example polyethylene glycol and polypropylene glycol moieties.

The above moieties are known to those skilled in the art of recording media, for example ink jet recording media.

Hydroxylamine moiety-containing compounds are for example those disclosed in U.S. Pat. Nos. 4,590,231, 4,612,393, 4,649,221, 4,668,721, 4,691,015, 4,696,964, 4,703,073, 4,720,517, 4,757,102, 4,782,105, 4,831,134, 4,876,300, 5,006,577, 5,019,285, 5,064,883, 5,185,448 and 5,235,056, the relevant parts of which are incorporated herein by reference.

The amine oxide moiety-containing compounds are for example those disclosed in U.S. Pat. Nos. 5,081,300, 5,162,408, 5,844,029, 5,880,191 and 5,922,794, the relevant parts of each incorporated herein by reference.

Suitable functional moiety-containing compounds are acrylate compounds that may undergo Michael type reactions with nucleophilic hydroxyl and/or amine of the finished prepolymer, or may likewise may be copolymerized with the starting monomers via free radical polymerization.

The monomers and oligomers below contain one or more functional moieties according to the present invention. They may fall into one or more than one of the present moiety categories.

Nonionic, zwitterionic and cationic monomers as suitable functional moiety-containing compounds according to this invention are disclosed for example in U.S. Pat. No. 6,313,246, filed Jul. 7, 1999, the relevant disclosure of which is hereby incorporated by reference.

Representative nonionic monomers that are functional moiety-containing compounds according to the present invention are for example
acrylamide, methacrylamide, N-methylacrylamide, N,N-dimethyl(meth)acrylamide, N-isopropyl(meth)acrylamide, N-(2-hydroxypropyl)methacrylamide, N-methylolacrylamide, N-vinylformamide, N-vinylacetamide, N-vinyl-N-methylacetamide, poly(ethylene glycol)(meth)-acrylate, poly(ethylene glycol)monomethyl ether mono(meth)acrylate, N-vinyl-2-pyrrolidone, glycerol mono((meth)acrylate), 2-hydroxyethyl(meth)acrylate, vinyl methylulfone, vinyl acetate, diacetone acrylamide, and acrylates such as methyl-methacrylate, acrylic acid, hydroxyethylmethacrylate (HEMA), amino acrylates and amino methacrylates and associative monomers. Amino methacrylates are for example dimethylaminoethylmethacrylate and tert-butylaminoethylmethacrylate. Associative monomers are for example stearyl ethoxy (20) methacrylate and stearyl ethoxy (10) allyl ether.

For example, functional moiety-containing compounds according to this invention are zwitterionic monomers selected from the group consisting of
N,N-dimethyl-N-acryloyloxyethyl-N-(3-sulfopropyl)-ammonium betaine,
N,N-dimethyl-N-acryloyloxyethyl-N-(2-carboxymethyl)-ammonium betaine,
N,N-dimethyl-N-acrylamidopropyl-N-(3-sulfopropyl)-ammonium betaine,
N,N-dimethyl-N-acrylamidopropyl-N-(2-carboxymethyl)-ammonium betaine,
2-(methylthio)ethyl methacryloyl-S-(sulfopropyl)-sulfonium betaine,
2-[(2-acryloylethyl)dimethylammonio]ethyl 2-methyl phosphate,
2-(acryloyloxyethyl)-2'(trimethylammonim)ethyl phosphate,
[(2-acryloxylethyl)dimethylammonio]methyl phosphonic acid,
2-methacryloyloxyethyl phosphorylcholine (MPC),
2-[(3-acrylamidopropyl)dimethylammonio]ethyl 2'-isopropyl phosphate (AAPI),
1-vinyl-3-(3-sulfopropyl)imidazolium hydroxide,
(2-acryloxyethyl) carboxymethyl methylsulfonium chloride,
1-(3-sulforoyl)-2-vinylpyridinium betaine,
N-(4-sulfobutyl)-N-methyl-N,N-diallylamine ammonium betaine (MDABS) and
N,N-diallyl-N-methyl-N-(2-sulfoethyl) ammonium betaine.

Suitable cationic monomers that are functional moiety-containing compounds according to the present invention are for example
quaternary or acid salts of dialkylaminoalkyl acrylates and methacrylates, the quaternary or acid salts of dialkylaminoalkylacrylamides and methacrylamides, N,N-di-allyl-dialkyl ammonium halides, Mannich products, and the like. Representative are N,N-di-methylaminoethylacrylate methyl chloride quaternary salt (DMAEA.MCQ), diallyldimethylammonium chloride (DADMAC), and the like.

Suitable functional moiety-containing compounds according to the present invention are for example alkyl or hydroxyalkyl acrylates or methacrylates, for example methyl, ethyl, butyl, 2-ethylhexyl and 2-hydroxyethyl acrylate, isobornyl acrylate, and methyl and ethyl methacrylate. Further examples are acrylonitrile, acrylamide, methacrylamide, N-substituted (meth)acrylamides, vinyl esters such as vinyl acetate, vinyl ethers such as isobutyl vinyl ether, styrene, alkylstyrenes, halostyrenes, N-vinylpyrrolidone, vinyl chloride and vinylidene chloride.

Further examples of functional moiety-containing compounds are certain monomers containing more than one double bond, for example ethylene glycol diacrylate, propylene glycol diacrylate, neopentyl glycol diacrylate, hexamethylene glycol diacrylate, bisphenol A diacrylate, 4,4'-bis(2-acryloyloxyethoxy)diphenylpropane, trimethylolpropane triacrylate, ethoxylated and propoxylated trimethylolpropane triacrylate, pentaerythritol triacrylate and tetraacrylate, pentaerythritol divinyl ether, vinyl acrylate, divinyl benzene, divinyl succinate, diallyl phthalate, triallyl phosphate, triallyl isocyanurate or tris(2-acryloylethyl)isocyanurate.

Trimethylolpropane triacrylate (TMPTA), and ethoxylated and propoxylated trimethylolpropane triacrylate are examples of polyol-polyacrylates. The ethoxylated and propoxylated compounds are acrylates of the ethoxylated and propoxylated trimethylol-propane. These definitions include polyethoxylated and polypropoxylated polyol.

Further examples of functional moiety-containing compounds are certain high molecular weight (oligomeric) polyunsaturated compounds, for example acrylated epoxy resins, acrylated polyethers, acrylated polyurethanes and acrylated polyesters. Further examples of unsaturated oligomers are unsaturated polyester resins, which are usually prepared from maleic acid, phthalic acid and one or more diols and which have molecular weights of greater than about 500.

Functional moiety-containing compounds are for example unsaturated compounds which are esters of ethylenically unsaturated carboxylic acids and polyols or polyepoxides, and polymers containing ethylenically unsaturated groups in the chain or in side groups, including unsaturated polyesters, polyamides and polyurethanes and copolymers thereof, polybutadiene and butadiene copolymers, polyisoprene and isoprene copolymers, polymers and copolymers containing (meth)acrylic groups in side-chains, as well as mixtures of one or more than one such polymer.

Illustrative examples of unsaturated carboxylic acids are acrylic acid, methacrylic acid, crotonic acid, itaconic acid, cinnamic acid, unsaturated fatty acids such as linolenic acid or oleic acid.

Suitable polyols are aromatic and aliphatic and cycloaliphatic polyols. Aromatic polyols are typically hydroquinone, 4,4'-dihydroxydiphenyl, 2,2-bis(4-hydroxyphenyl) propane, as well as novolacs and cresols. Polyepoxides include those based on the cited polyols, for example on the aromatic polyols and epichlorohydrin. Further suitable polyols are polymers and copolymers which contain hydroxyl groups in the polymer chain or in side groups, for example polyvinyl alcohol and copolymers thereof or hydroxyalkyl polymethacrylates or copolymers thereof. Other suitable polyols are oligoesters carrying hydroxyl end groups.

Illustrative examples of aliphatic and cycloaliphatic polyols are alkylenediols containing preferably 2 to 12 carbon atoms, including ethylene glycol, 1,2- or 1,3-propanediol, 1,2-, 1,3- or 1,4-butanediol, pentanediol, hexanediol, octanediol, dodecanediol, diethylene glycol, triethylene glycol, polyethylene glycols having molecular weights of preferably 200 to 1500, 1,3-cyclopentanediol, 1,2-, 1,3-or 1,4-cyclohexanediol, 1,4-dihydroxy-methylcyclohexane, glycerol, tris(β-hydroxyethyl)amine, trimethylolethane, trimethylol-propane, pentaerythritol, dipentaerythritol and sorbitol.

The polyols may be esterified partially or completely with one or with different unsaturated carboxylic acids, in which case the free hydroxyl groups of the partial esters may be modified, for example etherified, or esterified with other carboxylic acids.

Illustrative examples of esters are: Trimethylolpropane triacrylate, trimethylolethane triacrylate, trimethylolpropane trimethacrylate, trimethylolethane trimethacrylate, tetra-methylene glycol dimethacrylate, triethylene glycol dimethacrylate, tetraethylene glycol diacrylate, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol pentacrylate, dipentaerythritol hexacrylate, tripentaerythritol octacrylate, pentaerythritol dimethacrylate, pentaerythritol trimethacrylate, dipentaerythritol dimethacrylate, dipentaerythritol tetramethacrylate, tripentaerythritol octamethacrylate, penta-erythritol diitaconate, dipentaerythritol trisitaconate, dipentaerythritol pentaitaconate, dipentaerythritol hexaitaconate, ethylene glycol diacrylate, 1,3-butanediol diacrylate, 1,3-butanediol dimethacrylate, 1,4-butanediol diitaconate, sorbitol triacrylate, sorbitol tetraacrylate, pentaerythritol-modified triacrylate, sorbitol tetramethacrylate, sorbitol pentacrylate, sorbitol hexacrylate, oligoester acrylates and methacrylates, glycerol di- and -triacrylate, 1,4-cyclohexanediacrylate, bisacrylates and bis-methacrylates of polyethylene glycol having molecular weights of 200 to 1500, or mixtures thereof. Polyfunctional monomers and oligomers are available for example from UCB Chemicals, Smyrna, Ga., and Sartomer, Exton, Pa.

Suitable functional moiety-containing compounds are also ethylenically unsaturated polymerizable compounds are the amides of identical or different unsaturated carboxylic acids of aromatic, cycloaliphatic and aliphatic polyamines containing for instance 2 to 6, for example 2 to 4, amino groups. Exemplary of such polyamines are ethylenediamine, 1,2- or 1,3-propylenediamine, 1,2-, 1,3-or 1,4-butylenediamine, 1,5-pentylenediamine, 1,6-hexylene-diamine, octylenediamine, dodecylenediamine, 1,4-diaminocyclohexane, isophoronediamine, phenylenediamine, bisphenylenediamine, bis(β-aminoethyl) ether, diethylenetriamine, triethylenetetramine, bis (β-aminoethoxy)ethane or bis(β-aminopropoxy)ethane. Other suitable polyamines are polymers and copolymers which may contain additional amino groups in the side-chain and oligoamides containing amino end groups.

Exemplary of such unsaturated amides are: Methylenebisacrylamide, 1,6-hexamethylenebisacrylamide, diethylenetriaminetrismethacrylamide, bis(methacrylamido-propoxy) ethane, β-methacrylamidoethylmethacrylate, N-[(β-hydroxyethoxy)ethyl]acrylamide.

Suitable unsaturated polyesters and polyamides are derived typically from maleic acid and diols or diamines. Maleic acid can be partially replaced by other dicarboxylic acids such as fumaric acid, itaconic acid, citraconic acid, mesaconic acid or chloromaleic acid. To control the reactivity of the polyester and hence the product properties, it is possible to use in addition to the unsaturated dicarboxylic acids different amounts of saturated dicarboxylic acids such as phthalic acid, isophthalic acid, terephthalic acid, tetrahydrophthalic acid, succinic acid or adipic acid. The polyesters and polyamides can also be derived from dicarboxylic acids and ethylenically unsaturated diols or diamines, especially from those with long chains containing typically from 6 to 20 carbon atoms. Polyurethanes are typically those derived from saturated or unsaturated diisocyanates and unsaturated and saturated diols.

Suitable functional moiety-containing compounds which are polyester acrylates or acrylated polyesters are obtained by reacting oligomers, typically epoxides, urethanes, polyethers or polyesters, with acrylates such as hydroxyethyl acrylate or hydroxypropyl acrylate.

Polybutadiene and polyisoprene and copolymers thereof are known. Suitable comonomers include olefins such as ethylene, propene, butene, hexene, (meth)acrylates, acrylonitrile, styrene or vinyl chloride. Polymers containing (meth) acrylate groups in the side-chain are also known. They may typically be reaction products of epoxy resins based on novolak with (meth)acrylic acid, homo- or copolymers of polyvinyl alcohol or their hydroxy-alkyl derivatives which are esterified with (meth)acrylic acid or homo- and copolymers of (meth)acrylates which are esterified with hydroxyalkyl(meth)acrylates.

Specific examples of the present copolymers are:

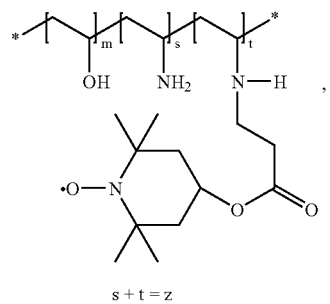

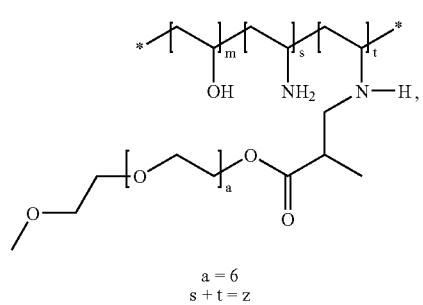

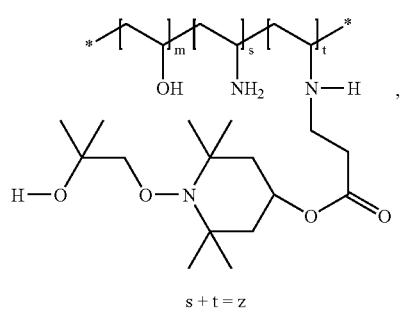

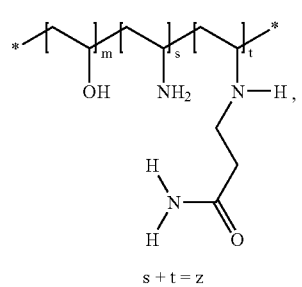

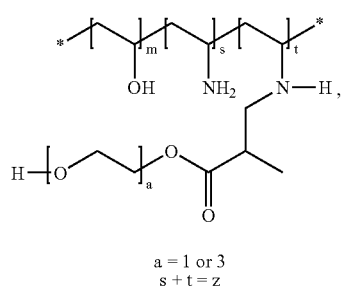

-continued
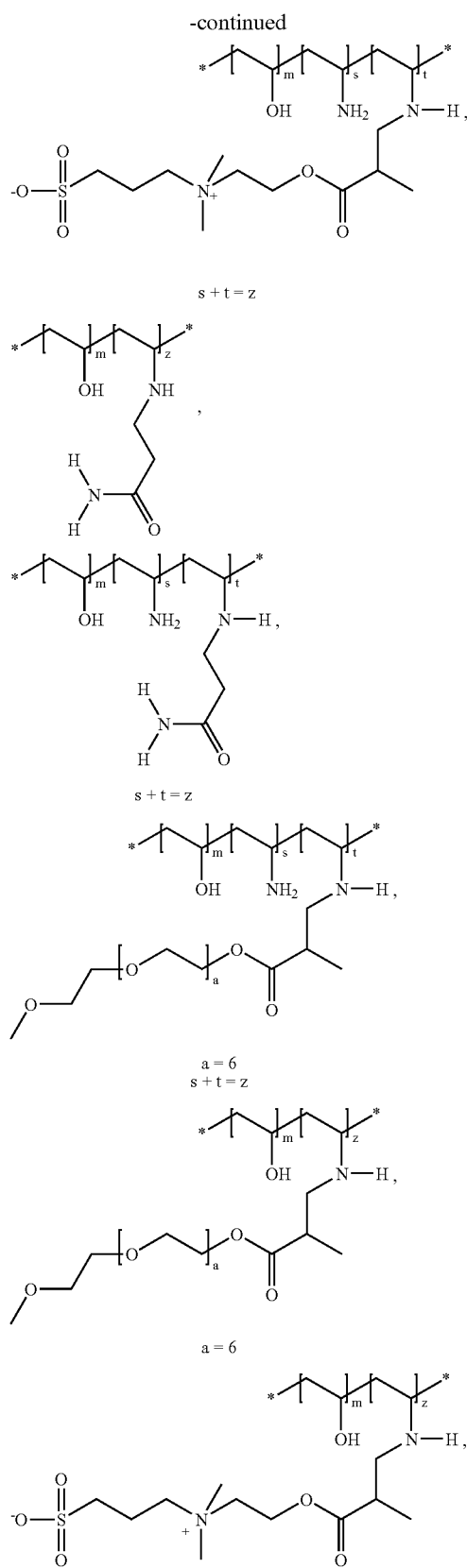
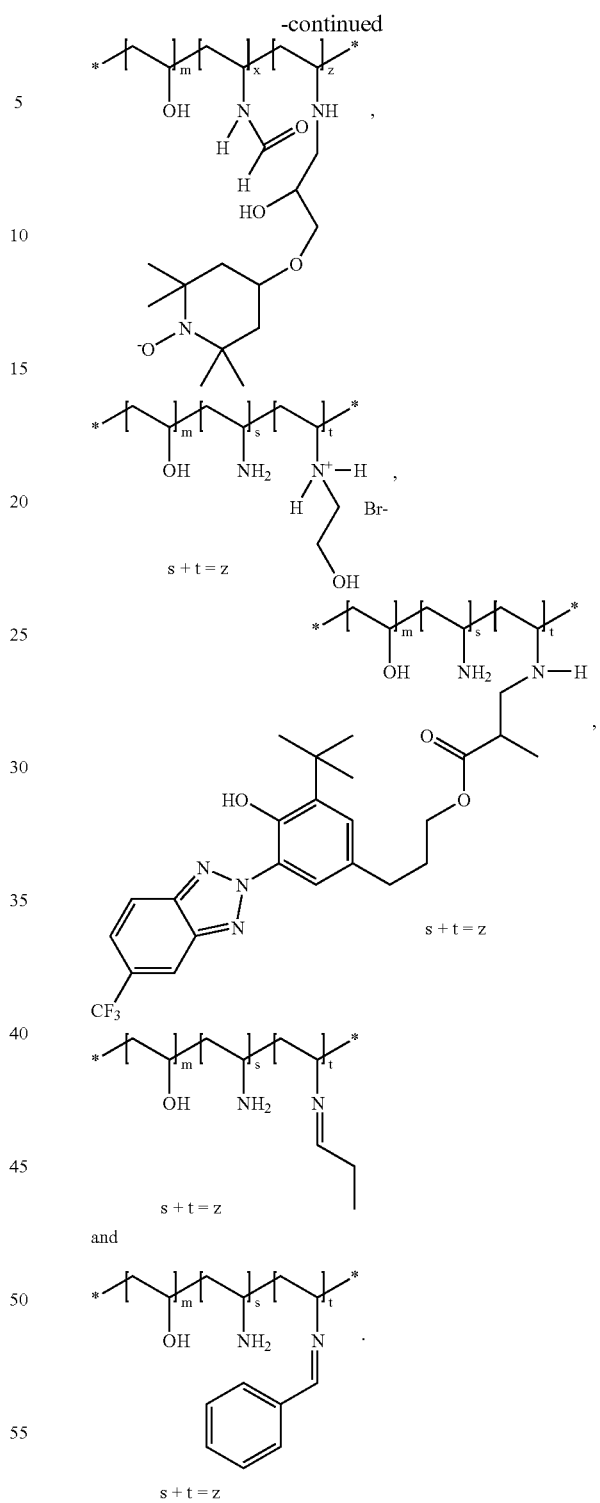
The present copolymers are advantageously employed to stabilize organic materials.
Accordingly, the present invention relates to a stabilized composition which comprises an organic material subject to the deleterious effects of actinic radiation, heat and oxygen and an effective stabilizing amount of a copolymer of the present invention.

In particular, the present copolymers are advantageously employed in ink jet recording media.

For the purposes of this invention, the terms "ink jet media", "ink jet recording media" or "ink jet media system" or "ink jet recording media system" refers to the entire composition which receives the ink jet ink, or likewise also refers to any individual layers or combinations of individual layers of the entire composition.

The term "ink receptive layer" means the ink-receiving or image-forming layer. The ink receptive layer can be considered as a sponge layer intended for the absorption of the ink.

The term "protective coating layer" means a top coating layer of the ink jet media system, or overcoat layer, that may be employed to provide specific properties as outlined above. Protective coating layers are typically thin in comparison to the ink-receptive layer. The protective coating layer is the outermost layer, and must allow for ink penetration or may be applied in a subsequent lamination step.

The term "support" refers to the base substrate of the ink jet media, for example paper itself. The present supports are naturally occurring materials or are synthetic.

Supports are for example paper or a rigid or flexible plastic sheet or film. Plastic supports may include transparent plastics, translucent plastics, matte plastics, opaque plastics, resin-coated papers, nonwoven synthetic fiber textiles, and the like.

Supports may be for example cellulose esters, cellulose acetate, polyesters, polystyrene, polyethylene, poly(vinyl acetate), polypropylene, polycarbonate, polymethacrylic acid and methyl and ethyl esters, polyamides such as nylons, polyesters such as poly-(ethylene terephthalate) (PET), polyimides, polyethers, polyvinyl chloride, polytetrafluoroethylene, polyvinylidene fluoride and polysulfonamides.

Barrier layers are advantageously employed between a paper support and the ink receptive layer. The barrier layer is for example polyolefin, for instance polyethylene. The barrier layer may also be a metal foil, such as aluminum foil.

Coating layers comprising the copolymers of this invention are cured with any conventional technique. For example, the present coating layers are cured air dried under ambient conditions, are oven-cured, or are photo-cured.

Examples of polymers typically employed in ink jet media coating layers, either alone or in combination with other resins, fillers and additives include water soluble and water insoluble resins such as gelatin, starch, styrene butadiene rubber latex, homopolymers and copolymers of (meth) acrylic acid esters, polyacrylic acid, nitrile butadiene rubber latex, polyethylene glycol, polyacrylamide, polyvinyl alcohol, polyurethane latexes and dispersions, vinyl alcohol/vinyl acetate copolymer, polyalkyl oxazoline, polyphenyl oxazoline, polyethyleneimines, methyl cellulose, hydroxymethyl cellulose, hydroxyethyl cellulose, hydroxypropy methyl cellulose, hydroroxypropyl ethyl cellulose, hydroxyethyl methyl cellulose, carboxymethyl cellulose and various poly (N-vinyl heterocycles) such as poly(N-vinyl pyrrolidone).

The copolymers of this invention are advantageously employed with cationic species such as oligomeric and polymeric amine salts, for example, those disclosed in U.S. Pat. No. 5,474,843 and elsewhere. Representative cationic polymers include those containing one or more monomers selected from quaternary or acid salts of dialkylaminoalkyl acrylates and methacrylates, the quaternary or acid salts of dialkylaminoalkylacrylamides and methacrylamides, N,N-diallyldialkyl ammonium halides, Mannich products, and the like. Representative are N,N-dimethylaminoethylacrylate methyl chloride quaternary salt (DMAEA-MeCl-q), diallyldimethylammonium chloride (DADMAC), and the like.

Other suitable components may be present in the ink jet media systems and coatings of the present invention.

The coating may advantageously employ crosslinking agents in order to limit or adjust the solubility of the applied coating. These may be selected to insolubilize either the subject copolymers, other component(s) of the coating, or a combination of these. Suitable crosslinking agents for the subject copolymers include materials known in the art to crosslink polyvinyl alcohols, e.g. glyoxal, ammonium zirconium carbonates, melamine ethers, etc.

Additional components include for example pigments and fillers, for example amorphous and crystalline silica, aluminum trihydrate, kaolin, talcum, chalk, betonite, zeolites, glass beads, calcium carbonate, potassium sodium aluminum silicate, diatomaceous earth, silicates of aluminum and magnesium and mixtures thereof. Titanium doxide may also be used for certain applications. Organic particulates which may be employed include polyolefins, polystyrene, polyurethane, starch, poly(methyl methacrylate) and polytetrafluoroethylene. Pigments, fillers and organic particulates may be employed in coating layers of the present invention from about 0.1 to about 90% by weight, based on the weight of the dry coating. Polyolefins are for example polypropylene or polyethylene.

The present copolymers may advantageously be employed as a binder or part of a binder for a microporous or a nanoporous ink jet media system.

Paper substrates are for example advantageously coated with clay or a plastic resin such as polyethylene or polyvinyl chloride prior to coating with the ink jet receptive layer.

Additional additives also include surface active agents which control wetting or spreading action of the coating mixture, antistatic agents, thickeners, suspending agents, particulates which control the frictional properties or alter the reflective properties or act as spacers, pH controlling compounds, light stabilizers, antioxidants, humectants, bacteriostats, crosslinking agents, optical brighteners, etc.

Specific examples are starch, xanthan gum, quaternary ammonium salts, chitin, cellulose derivatives, and water soluble metal salts, for instance salts of Ca, Ba, Mg or salts of the rare earth metal series.

The present ink jet media may also comprise zwitterionic polymers or oligomers, for example those taught in co-pending U.S. Pat. No. 6,313,246, filed Jul. 7, 1999, the relevant disclosure of which are hereby incorporated by reference.

Stabilizer systems have been developed for the ink colorants. These stabilizers are also employed in the ink jet media systems of the present invention. They are disclosed for example in U.S. Pat. Nos. 5,782,963 and 5,855,655, the relevant disclosures of which are hereby incorporated by reference.

Additional additives that are advantageously employed as components of coating layers of an ink jet media system include those of the known classes of polymer stabilizers. For example, polymer stabilizers selected from the group consisting of ultraviolet light absorbers, hindered amine light stabilizers (HALS), and antioxidants.

For example, suitable additional additives are selected from:

Antioxidants selected from the group consisting of alkylated monophenols, alkylthiomethylphenols, hydroquinones and alkylated hydroquinones, tocopherols, hydroxylated thiodiphenyl ethers, alkylidenebisphenols, hindered phenols derived from benzyl compounds, hydroxybenzylated malonates, aromatic hydroxybenzyl compounds, triazine-based hindered phenols, benzylphosphonates, acylaminophenols, esters of $\beta$-(3,5-di-tert-butyl-4-hydroxyphenyl)propionic acid with mono- or polyhydric alcohols, esters of β-(5-tert-butyl-4-hydroxy-3-methylphenyl)propionic acid with mono- or polyhydric alcohols, esters of β-(3,5-dicyclohexyl-4-hydroxyphenyl)propionic acid with mono- or polyhydric alcohols, esters of 3,5-di-tert-butyl-4-hydroxyphenyl acetic acid with mono- or polyhydric alcohols, amides of β-(3,5-di-tert-butyl-4-hydroxyphenyl)propionic acid, ascorbic acid and aminic antioxidants, for example N,N'-diisopropyl-p-phenylenediamine; and UV absorbers and light stabilizers selected from the group consisting of 2-(2-hydroxyphenyl)-2H-benzotriazoles, for example known commercial hydroxyphenyl-2H-benzotriazoles, 2-hydroxybenzophenones, esters of substituted and unsubstituted benzoic acids, for example 4-tertbutyl-phenyl salicylate, acrylates and malonates, oxamides, tris-aryl-o-hydroxyphenyl-s-triazines and sterically hindered amine stabilizers, for example N—H, N-acyl, N-oxyl, N-hydroxyl, N-alkyl, N-alkoxy and N-hydroxyalkoxy hindered amines.

For example, the nitroxyl, hydroxylamine and hydroxylamine salt stabilizers as disclosed in U.S. Pat. No. 6,254,724 are advantageously used in the recording media of the present invention. The relevant parts of U.S. Pat. No. 6,254,724 are hereby incorporated by reference.

For instance, UV absorbers are advantageously employed in protective coating layers of the present invention, whether the protective coating layer is part of the prepared recording media system or whether it is applied in a subsequent lamination step.

Another object of the present invention is a method for preparing an ink jet media system, which method comprises applying one or more coating layers on a support, wherein at least one of the coating layers comprises a copolymer as described above.

Any known method may be employed in the application of the individual coating layers of the present ink jet media systems. Known methods are for example Meyer bar coating, reverse roll coating, roller coating, wire-bar coating, dip-coating, air-knife coating, slide coating, curtain coating, doctor coating, flexographic coating, wound wire coating, slot coating, slide hopper coating and gravure coating.

Inks for ink jet printing are well known. These inks comprise a liquid vehicle and a dye or pigment dissolved or suspended therein. The liquid vehicle employed comprises water or a mixture of water and a water miscible organic solvent. The inks may also be vehicles for additives or other components that are to be incorporated into the recording media system.

Protective coating layers are typically about 1 micron thick. Supports are typically from about 12 microns to about 500 microns thick. Ink receptive layers are typically about 0.5 to about 30 microns thick.

The following Examples are for illustrative purposes only and are not to be construed as limiting the present invention in any manner whatsoever.

PREPARATION EXAMPLES

Example 1

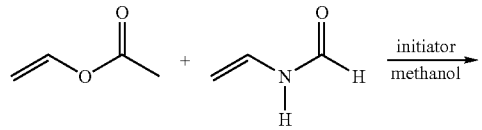

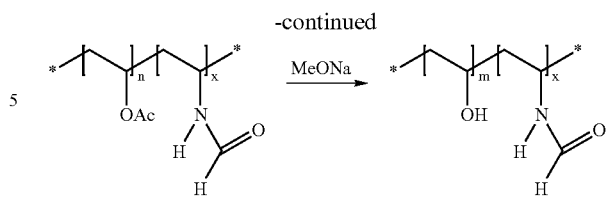

Vinyl acetate (525 g, 6.1 moles), N-vinylformamide (45 g, 0.63 mole), and methanol (332 g, 10.4 moles) are added to a three-liter laboratory flask equipped with the necessary auxiliary equipment. The contents are heated to 60° C. at which time tert-butylperoxyneodecanoate (5.5 g, 0.023 mole), dissolved in 30 mL of methanol, is added drop wise over 15 minutes. A solution of N-vinylformamide (80 g, 1.13 mole) and vinyl acetate (720 g, 8.36 moles) is added to the lab reactor over four hours. The polymerization is continued for 15 minutes after the solution addition is completed. A solution of sodium nitrite (0.5 g, 0.007 mole) in methanol (39.6 g, 1.24 mole) is added to the reaction flask. The reaction mass is cooled to ambient temperature and sodium methoxide (8 g of sodium dissolved in 40 mL of methanol) is added drop wise over one hour. A white solid is formed which is filtered and washed with 1.5 liters of methanol. After drying, the title random copolymer is received as a white solid weighing 580 grams having a molecular weight of 146,000 as determined by gel permeation chromatography (GPC).

Example 2

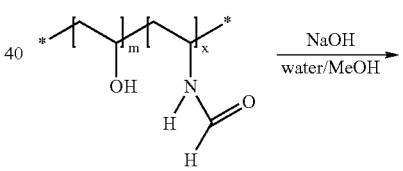

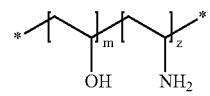

The random copolymer of Example 1 (300 g) and methanol (1500 g, 46.9 moles) are added to a laboratory flask equipped with the necessary auxiliary equipment. To this stirred suspension is added 50% aqueous sodium hydroxide at a 1:1 molar ratio. The suspension is heated to 60° C. and held there for six hours. The solids are filtered and washed with 1.5 L of methanol. The solids are dried in a vacuum oven until constant weight is achieved. The title random copolymer is received as a white solid weighing 280 grams having a molecular weight of 107,000 as determined by gel permeation chromatography (GPC).

Example 3

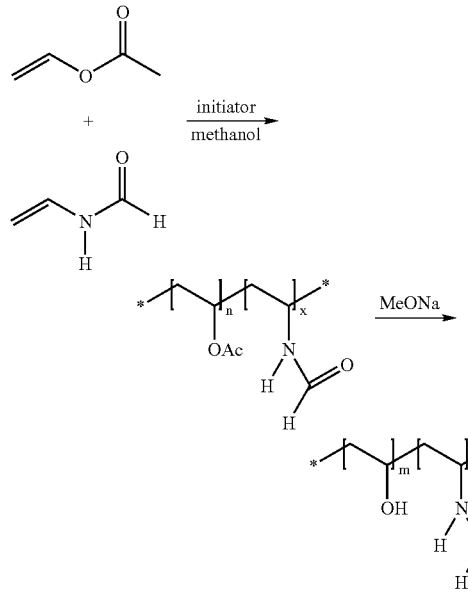

Vinyl acetate (1000 g, 11.6 moles), N-vinylformamide (20 g, 0.28 mole), and methanol (395 g, 12.4 moles) are added to a three-liter laboratory flask equipped with the necessary auxiliary equipment. The contents are heated to 60° C. at which time tert-butylperoxyneoecanoate (0.6 g, 0.0025 mole), dissolved in 25 mL of methanol, is added drop wise over 15 minutes. A solution of N-vinylformamide (30 g, 0.42 mole) and vinyl acetate (600 g, 6.98 moles) is added to the lab reactor over four hours. The polymerization is continued for 15 minutes after the solution addition is completed. A solution of sodium nitrite (0.5 g, 0.007 mole) in methanol (39.6 g, 1.24 mole) is added to the reaction flask. The reaction mass is cooled to ambient temperature and sodium methoxide (8 g of sodium dissolved in 40 mL of methanol) is added drop wise over one hour. A white solid is formed which is filtered and washed with 1.5 liters of methanol. After drying, the title random copolymer is received as a white solid weighing 690 grams having a molecular weight of 204,000 as determined by gel permeation chromatography (GPC). An $^1$HNMR analysis of the polymer sample shows: —OH group (80 mole %), —C(=O)CH$_3$ (14 mole %), and —N(H)C(=O)H (6 mole %).

Example 4

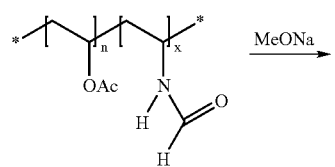

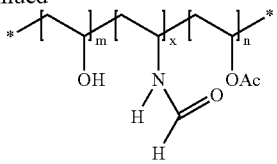

Following the hydrolytic procedure of Example 3, Example 3 (212 g) is further hydrolyzed to yield the title copolymer (200 g) as a white solid having a molecular weight of 195,000 as determined by gel permeation chromatography (GPC). An $^1$HNMR analysis of the polymer sample shows: —OH group (93 mole %), —C(=O)CH$_3$ (1 mole %), and —N(H)C(=O)H (6 mole %).

Example 5

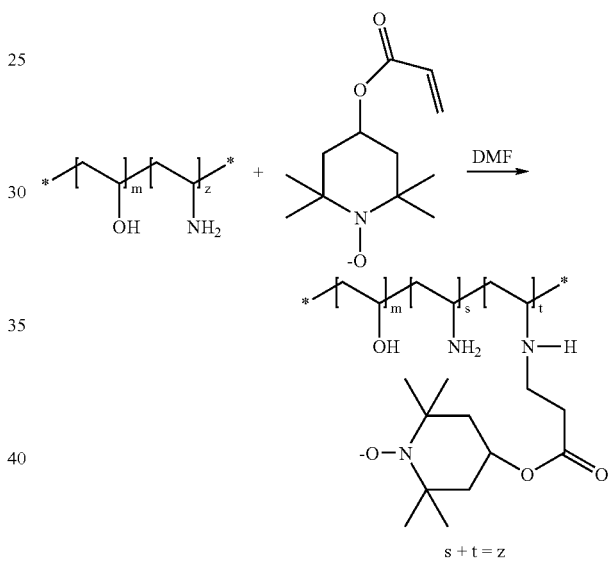

The polymer synthesized in Example 2 (30 g, 0.076 mole based on amine), acrylic acid 1-oxyl-2,2,6,6-tetramethyl-piperidin-4-yl ester (9 g, 0.04 mole), and N, N-dimethyl-formamide (472 g, 6.5 moles) are added to a reaction flask equipped with the necessary auxiliary equipment. The reaction mass is heated to 85° C. and held there for eight hours. Isopropanol (235.5 g, 3.9 moles) is added and the reaction mass is cooled to ambient temperature. The solids are filtered off and dried in a vacuum oven until a constant weight is maintained. The title polymer is obtained (35 g) as a pink solid having a Tg of 97° C.

Example 6

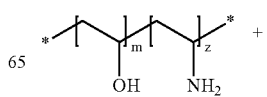

-continued

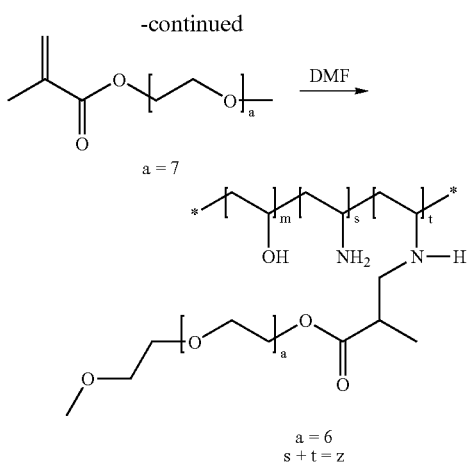

The polymer synthesized in Example 2 (35 g, 0.088 mole based on amine), 2-methyl-acrylic acid 2-{2-[2-(2-{2-[2-(2-methoxy-ethoxy)-ethoxy]-ethoxy}-ethoxy)-ethoxy]-ethoxy}-ethyl ester (22 g, 0.045 mole, Sartomer, CD-550), and N,N-dimethylformamide (472 g, 6.5 moles) are added to a reaction flask equipped with the necessary auxiliary equipment. The reaction mass is heated to 80° C. and held there for eight hours. Isopropanol (235.5 g, 3.9 moles) is added and the reaction mass is cooled to ambient temperature. The solids are filtered off and dried in a vacuum oven until a constant weight is maintained. The title polymer is obtained (36 g) as a white solid having a molecular weight of 148,000 as determined by gel permeation chromatography (GPC).

Example 7

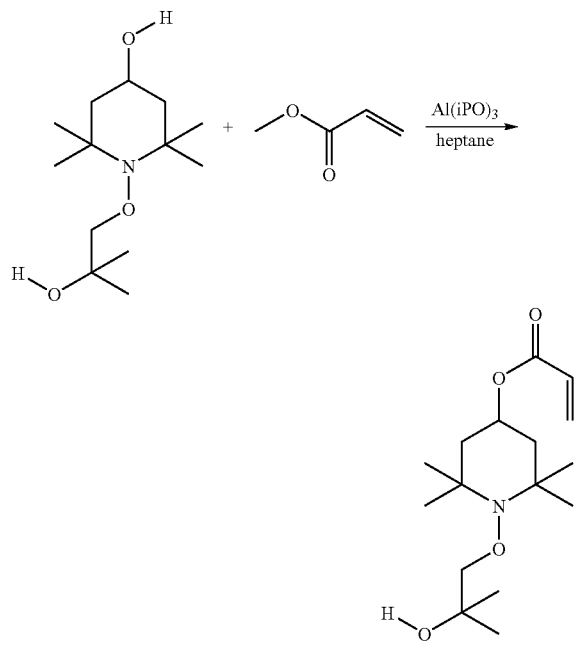

1-(2-Hydroxy-2-methyl-propoxy)-2,2,6,6-tetramethyl-piperidin-4-ol (25 g, 0.1 mole), methyl acrylate (12.9 g, 0.15 mole), aluminum isopropoxide (3.7 g, 0.18 mole), and heptane (136.8 g, 1.37 moles) are added to a reaction flask equipped with the necessary auxiliary equipment. The reaction mass is heated to 100° C. and held there for six hours. The reaction mass is cooled to ambient temperature, filtered, and the filtrate is washed with 2 N aqueous hydrochloric acid. The heptane is partially removed by distillation and the resulting solids are filtered. The filter cake is washed thrice with hot water and dried to constant weight in a vacuum oven. The title compound is received (20 g, 67% yield) as a white solid. $^1$HNMR (CDCl$_3$, 500 MHz): □ 1.17-1.30 (s, 18H), 1.61 (t, 2H), 1.88 (d, 2H), 2.10 (s, 1H), 3.66 (s, 2H), 5.10 (tt, 1H), 5.81 (d, 1H), 6.09 (dd, 1H), 6.39 (d, 1H).

Example 8

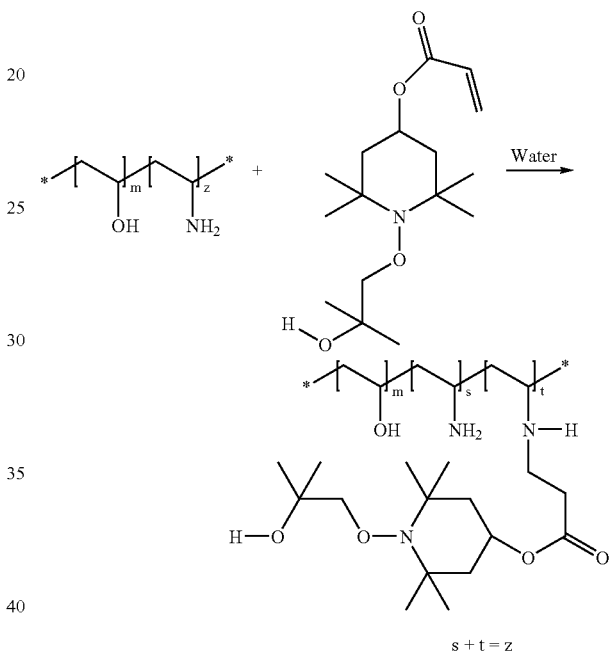

The copolymer synthesized in Example 2 (25 g, 0.063 mole based on amine), acrylic acid 1-(2-hydroxy-2-methyl-propoxy)-2,2,6,6-tetramethyl-piperidin-4-yl ester (0.8 g, 0.003 mole), and water (100 g, 5.6 mole) are added to a reaction flask equipped with the necessary auxiliary equipment. The reaction mass is heated to 75° C. and held there for four hours. A clear paste is formed during the reaction. The polymer solution concentration is adjusted to 20% solids with water and cooled to ambient temperature. The title copolymer is obtained (129 g) as a clear water-white solution having a molecular weight of 142,000 as determined by gel permeation chromatography (GPC).

Example 9

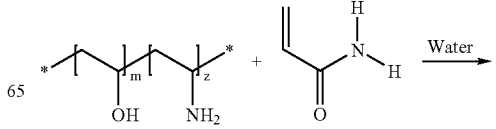

-continued

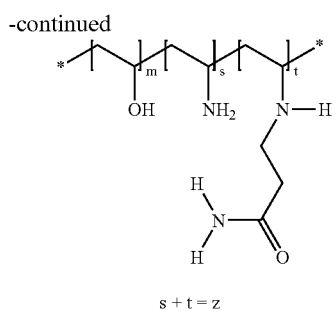

s + t = z

The copolymer synthesized in Example 2 (25 g, 0.063 mole based on amine), acrylamide (4 g, 0.056 mole), and water (100 g, 5.6 mole) are added to a reaction flask equipped with the necessary auxiliary equipment. The reaction mass is heated to 75° C. and held there for four hours. A clear paste is formed during the reaction. The polymer solution concentration is adjusted to 20% solids with water and cooled to ambient temperature. The title copolymer is obtained (145 g) as a clear water-white solution having a molecular weight of 159,000 as determined by gel permeation chromatography (GPC).

Example 10

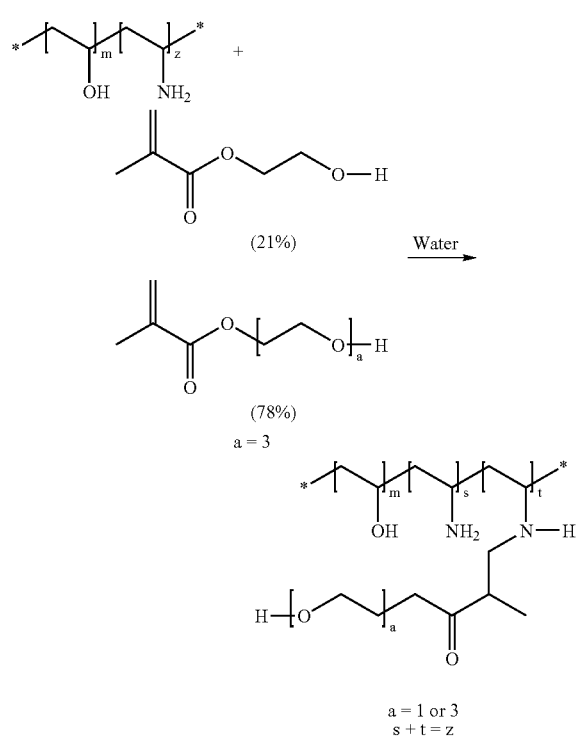

a = 1 or 3
s + t = z

The copolymer synthesized in Example 2 (25 g, 0.063 mole based on amine), Sartomer CD 570 (6 g. 0.03 mole), and water (100 g, 5.6 mole) are added to a reaction flask equipped with the necessary auxiliary equipment. The reaction mass is heated to 75° C. and held there for four hours. A clear paste is formed during the reaction. The polymer solution concentration is adjusted to 20% solids with water and cooled to ambient temperature. The title copolymer is obtained (155 g) as a clear water-white solution having a molecular weight of 167,000 as determined by gel permeation chromatography (GPC).

Example 11

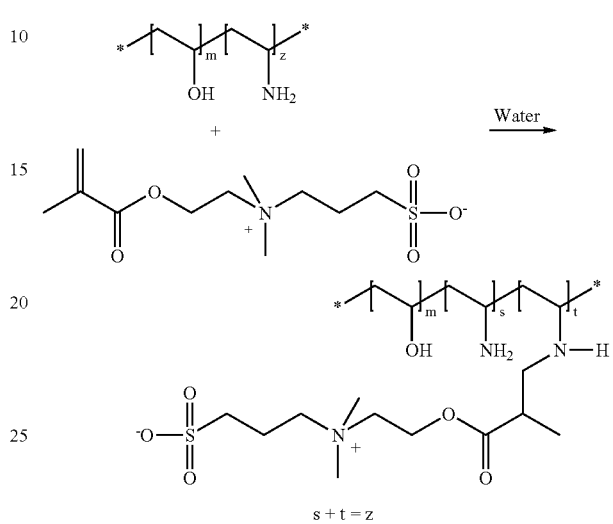

s + t = z

The copolymer synthesized in Example 2 (25 g, 0.063 mole based on amine), N-(3-sulfopropyl)-N-methacryloxy-ethyl-N,N-dimethylammonium betaine (4.5 g, 0.016 mole), and water (120 g, 5.6 mole) are added to a reaction flask equipped with the necessary auxiliary equipment. The reaction mass is heated to 75° C. and held there for four hours. A clear paste is formed during the reaction. The polymer solution concentration is adjusted to 20% solids with water and cooled to ambient temperature. The title copolymer is obtained (147.5 g) as a clear water-white solution having a molecular weight of 177,000 as determined by gel permeation chromatography (GPC).

Example 12

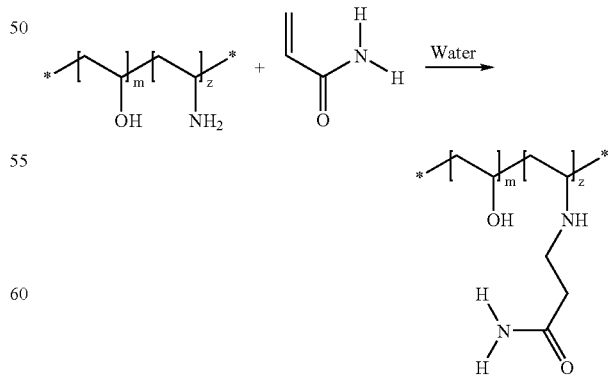

Following the synthetic procedure of Example 11, Example 2 (25 g, 0.063 mole based on amine) and acrylamide (4.5 g, 0.063 mole) are reacted together. The title polymer is obtained.

Example 13

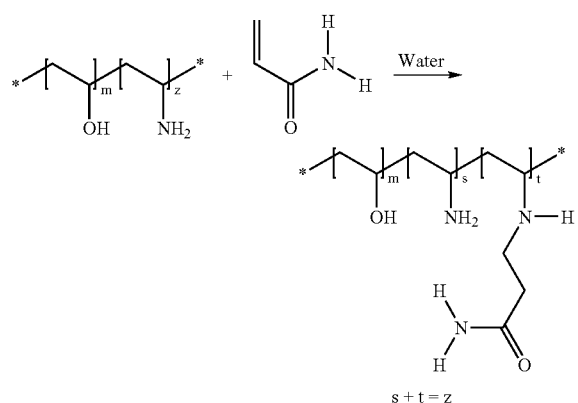

Following the synthetic procedure of Example 11, Example 2 (25 g, 0.063 mole based on amine) and acrylamide (2.3 g, 0.032 mole) are reacted together. The title copolymer is obtained.

Example 14

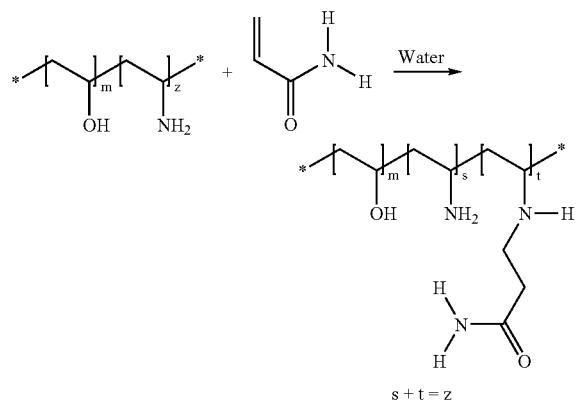

Following the synthetic procedure of Example 11, Example 2 (25 g, 0.063 mole based on amine) and acrylamide (1.1 g, 0.016 mole) are reacted together. The title copolymer is obtained.

Example 15

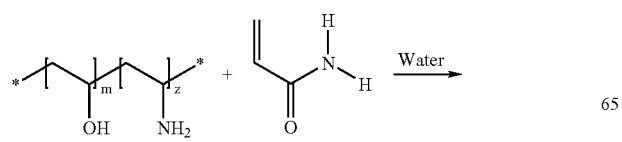

-continued

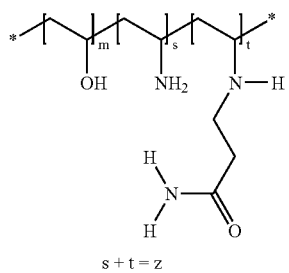

Following the synthetic procedure of Example 11, Example 2 (25 g, 0.063 mole based on amine) and acrylamide (0.04 g, 0.0006 mole) are reacted together. The title copolymer is obtained.

Example 16

Poly(methoxypolyethyleneglycolmethacrylate)-co-poly(acrylamide)-co-poly(N-(3-sulfopropyl)-N-methacryloxyethyl-N,N-dimethylammonium betaine)

Water (3415 g) is added to a 5-liter laboratory reaction flask equipped with the necessary auxiliary equipment. The flask is degassed with nitrogen and heated to 80° C. 2,2'-Azobis(amidinopropane)dihydrochloride (5 g, dissolved in 20 g of water) and a solution of acrylamide (150 g), methoxypolyethylene glycolmethacrylate (62.5 g, molecular weight is about 350), N-(3-sulfopropyl)-N-methacryloxyethyl-N,N-dimethylammonium betaine (37.5 g) and water (140.1 g) are added to the reaction flask. Once an exotherm is detected, a solution of acrylamide (450 g), methoxypolyethylene glycolmethacrylate (187.5 g, molecular weight is about 350), N-(3-sulfopropyl)-N-methacryloxyethyl-N,N-dimethylammonium betaine (112.5 g) and water (420.4 g) is added to the reaction flask over thirty minutes. Once the addition is complete, the reactor contents are held at 80° C. for an additional hour before cooling and filtering. The title copolymer is received as a 20% aqueous solution with a molecular weight of 250,000, as determined by GPC, and a viscosity of 450 cPs (Brookfield RVT, 20 rpm, spindle 3).

Example 17

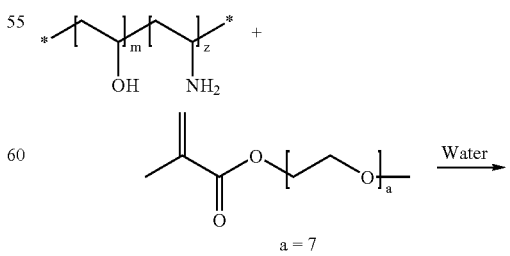

-continued

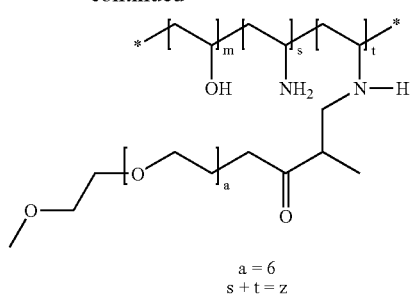

a = 6
s + t = z

Following the synthetic procedure of Example 10, Example 2 (10 g, 0.23 mole based on amine), water (112.5 g, 6.25 mole), and Sartomer CD 550 (2.5 g, 0.005 mole) are reacted together at 75° C. for four hours. The title copolymer is obtained (125 g) as a clear water-white solution having a molecular weight of 156,000 as determined by gel permeation chromatography (GPC).

Example 18

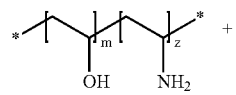

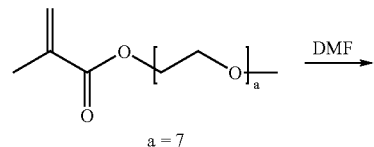

a = 7

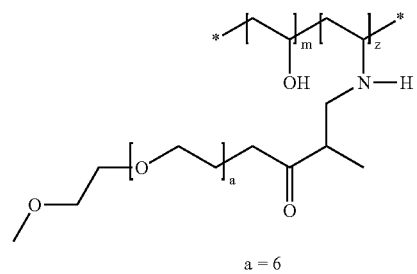

a = 6

The copolymer synthesized in Example 2 (25 g, 0.063 mole based on amine) and Sartomer CD 550 (31 g, 0.063 mole) are added to a laboratory flask equipped with the necessary auxiliary equipment. The reaction mass is heated to 75° C. at which time water (50 g, 2.78 moles) is added to a make a homogeneous paste. It is stirred for five hours then water is removed by distillation and cooled. The polymer is then ground with isopropanol in a blender and filtered. The solids are dried to constant weight in a vacuum oven. The title compound is received (42 g) as a white wax-like solid having a molecular weight of 262,000 as determined by gel permeation chromatography (GPC).

Example 19

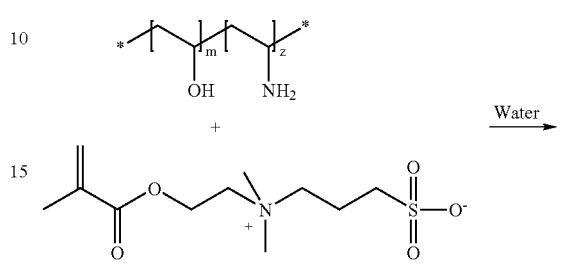

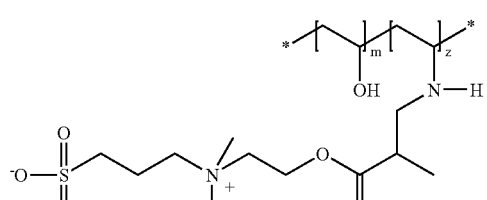

The copolymer synthesized in Example 2 (35 g, 0.088 mole based on amine), N (3 sulfopropyl)-N-methacryloxyethyl-N,N-dimethylammonium betaine (25 g, 0.088 mole), and water (200 g, 5.6 mole) are added to a reaction flask equipped with the necessary auxiliary equipment. The reaction mass is heated to 80° C. and held there for six hours. The water is evaporated and the copolymer is dried to constant weight in a vacuum oven. The copolymer is ground with isopropanol in a blender, filtered, and dried to constant weight in a vacuum oven. The title copolymer is obtained (64 g) as a white solid having a molecular weight of 269,000 as determined by gel permeation chromatography (GPC).

Example 20

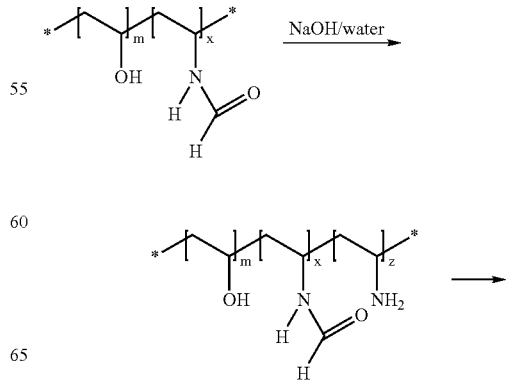

-continued

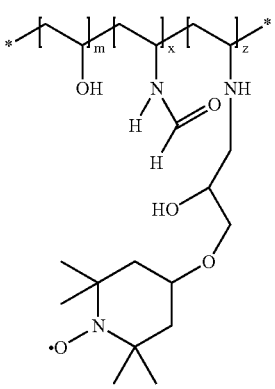

Poly(vinylalcohol)-co-poly(N-vinylformamide) (12% poly N-vinylformamide by weight, 30 g, 0.076 mole based on formamide) and water (500 g) are added to a laboratory reaction flask with the necessary auxiliary equipment. Sodium hydroxide (0.8 g, 0.02 mole) is added to the flask and the contents are heated to 80° C. After holding at 80° C. for 6 hours, the reaction is cooled to 45° C. and a pH of 11 is measured. 2,2,6,6-Tetramethyl-4-oxiranyl-methoxy-piperidin-1-oxyl (4.5 g, 0.02 mole) is added and is allowed to react for four hours at 45° C. The reaction mass is then allowed to stir overnight at ambient temperature. A pH of 7 is measured the next morning indicating reaction completion. The aqueous solution is washed twice with 300 mL of ethyl acetate. The concentration of the aqueous layer is adjusted to 5% solids with water. The title polymer is obtained as a light yellow solution (680 g) having a molecular weight of 176,000 as determined by gel permeation chromatography (GPC).

Example 21

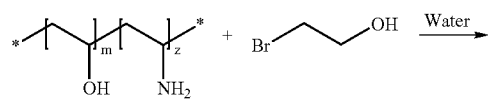

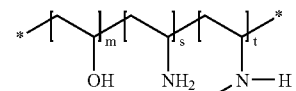

The copolymer synthesized in Example 2 (25 g, 0.063 mole based on amine) and ethylene bromohydrin (100 g, 0.8 mole) are added to a reaction flask equipped with the necessary auxiliary equipment. The reaction mass is heated to 85° C. and held there for 4.5 hours. A paste is formed during the reaction and water (50 g, 2.78 mole) is added to reduce the viscosity. The polymer solution is poured into 300 mL of ethanol and filtered. After drying, the title copolymer is obtained (21 g) as a white solid having a molecular weight of 166,000 as determined by gel permeation chromatography (GPC).

Example 22

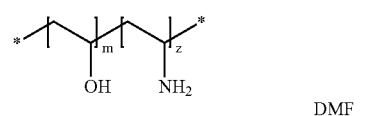

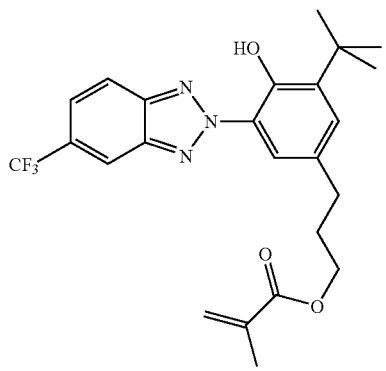

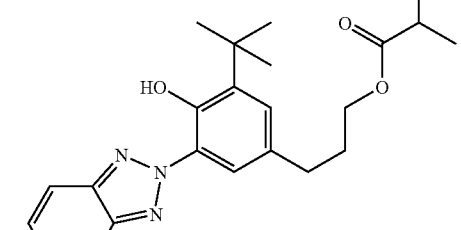

The copolymer synthesized in Example 2 (20 g, 0.05 mole based on amine), N,N-dimethylformamide (189 g, 2.58 mole), and 2-methyl-acrylic acid 3-[3-tert-butyl-4-hydroxy-5-(5-trifluoromethyl-benzotriazol-2-yl)-phenyl]-propyl ester (2.3 g, 0.005 mole) are added to a reaction flask equipped with the necessary auxiliary equipment. The reaction mass is heated to 85° C. and held there for 5 hours. The reaction mass is cooled down and 200 mL of methanol is added. The solids are filtered and washed with 200 mL of methanol. After drying, the title copolymer is obtained (19.5 g) as a light yellow solid having a molecular weight of 267,000 as determined by gel permeation chromatography (GPC).

Example 23

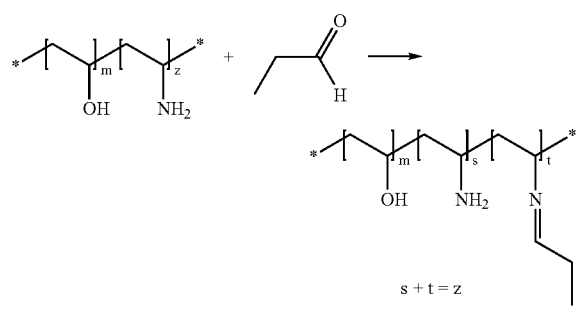

The copolymer synthesized in Example 2 (20 g, 0.05 mole based on amine) and propionaldehyde (80 g, 1.37 mole) are added to a reaction flask equipped with the necessary auxiliary equipment. The reaction mass is heated to reflux and held there for 5 hours. The reaction is cooled down to ambient temperature and filtered. The solids are washed with 100 mL of heptane. After drying, the title copolymer is obtained (17.7 g) as a white solid having a molecular weight of 239,000 as determined by gel permeation chromatography (GPC).

Example 24

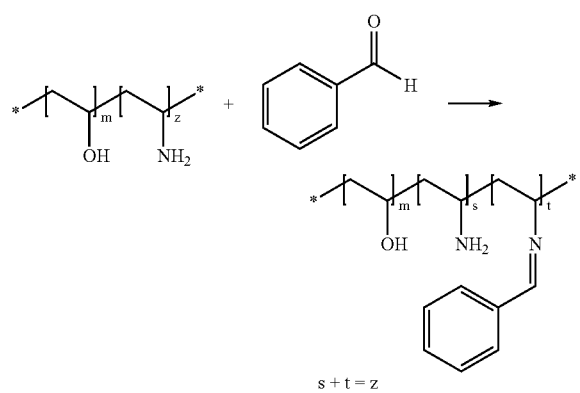

The copolymer synthesized in Example 2 (20 g, 0.05 mole based on amine) and benzaldehyde (104.4 g, 0.98 mole) are added to a reaction flask equipped with the necessary auxiliary equipment. The reaction mass is heated to 70° C. and held there for 6 hours. The reaction is cooled down to ambient temperature and filtered. The solids are washed with 200 mL of methanol. After drying, the title copolymer is obtained (18.3 g) as a white solid having a molecular weight of 244,000 as determined by gel permeation chromatography (GPC).

Application Example Polymer Compatibility

Different ratios of 10% aqueous polymer solutions are blended together and subsequently cast onto polyethylene coated paper. A typical procedure is given below:

100 parts of Example 16 as a 10% solution and 100 parts of polyvinyl alcohol as an aqueous solution are mixed together for 25 minutes. Agitation is ceased and the solution is allowed to deaerate for 20 minutes. Aqueous polymer solutions are then drawn down onto a polyethylene coated paper sheet using a Meyer bar so that a 20-micron coating thickness is obtained after oven drying.

Gloss readings (20° and 60°) are measured using a micro-TRI-gloss meter (BYK-Gardner). The higher the value for 20° and 60° gloss, the better the polymer blend compatibility.

| Copolymer Blend (50/50) | 20° Gloss Reading |
| --- | --- |
| Example 16/Example 2 | 14.8 |
| Example 16/PVOH | 29.4 |
| Example 16/Example 11 | 31.1 |
| Example 16/Example 17 | 47.2 |
| Example 16/Example 10 | 59.6 |

PVOH is Celvol 325 obtained from Celanese.

| Copolymer Blend (25/75) | 20° Gloss Reading |
| --- | --- |
| Example 16/Example 2 | 20.1 |
| Example 16/PVOH | 33.9 |
| Example 16/Example 11 | 36.8 |
| Example 16/Example 10 | 37.1 |
| Example 16/Example 17 | 57.6 |

PVOH is Celvol 325 obtained from Celanese.

| Copolymer Blend (50/50) | 60° Gloss Reading |
| --- | --- |
| Example 16/Example 2 | 56.3 |
| Example 16/PVOH | 69.4 |
| Example 16/Example 11 | 72.0 |
| Example 16/Example 17 | 83.3 |
| Example 16/Example 10 | 88.5 |

PVOH is Celvol 325 obtained from Celanese.

| Copolymer Blend (25/75) | 60° Gloss Reading |
| --- | --- |
| Example 16/Example 2 | 63.0 |
| Example 16/PVOH | 78.1 |
| Example 16/Example 10 | 80.5 |
| Example 16/Example 17 | 86.8 |

PVOH is Celvol 325 obtained from Celanese.

The data show the efficacy of the instant copolymers for the compatibilization of polymer blends.

The invention claimed is:

1. A functional moiety-containing PVOH/PVAm copolymer represented as

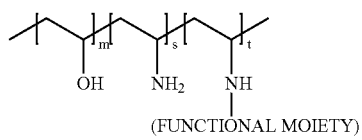

where
t is greater than or equal to 1,
s+t=z, z is between about 3 and about 50 mole percent,
m is the remainder of the mole percent and
where
FUNCTIONAL MOIETY is at least one functional moiety-containing compound, which compounds contain at least one functional moiety selected from the group consisting of hydroxyphenylbenzotriazole and hydroxphenyltriazine moieties.

2. A PVOH/PVAm copolymer according to claim 1 in which the moieties are selected from the group consisting of

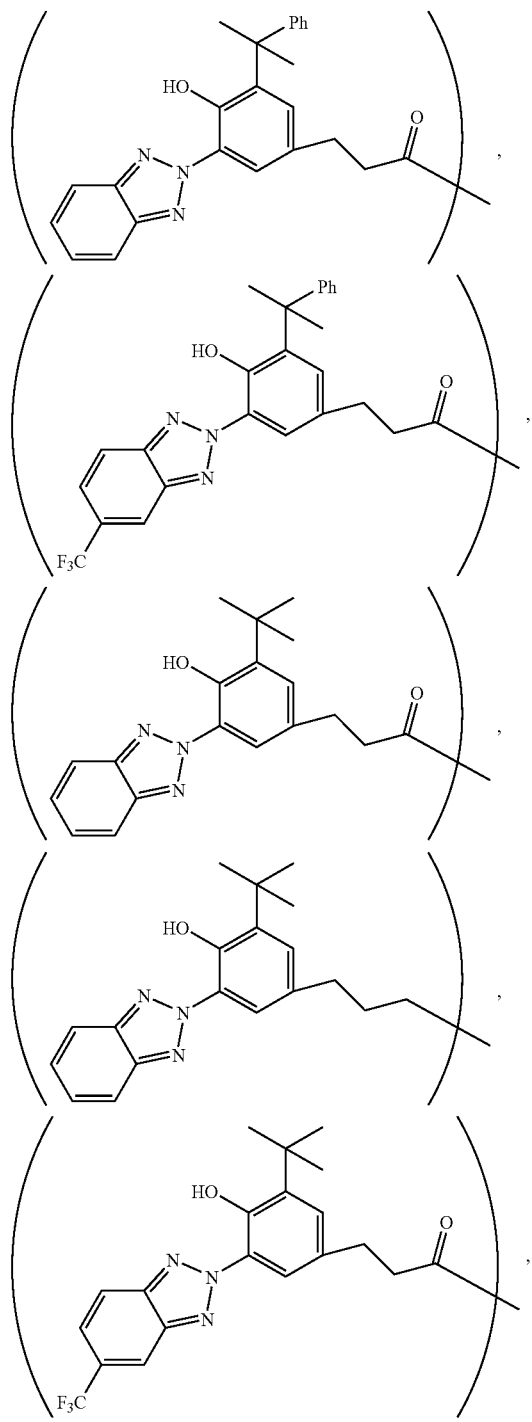

-continued

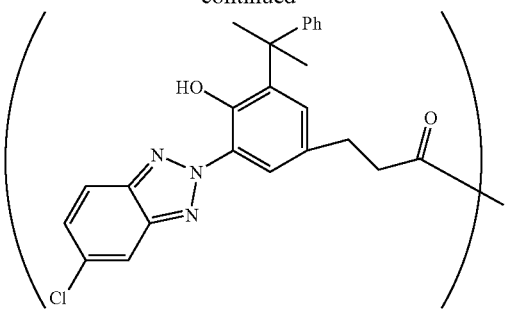

and

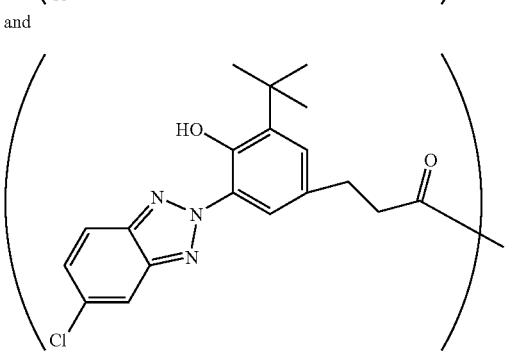

3. A composition comprising an ink jet recording media system that comprises a support and one or more coating layers thereon, wherein at least one coating layer comprises the PVOH/PVAm copolymer according to claim 1.

4. The composition according to claim 3 which comprises a coating directly on a support, wherein the coating comprises the PVOH/PVAm copolymer.

5. The composition according to claim 3 which comprises a support and at least one ink jet ink receptive layer, wherein one or more than one of said receptive layers comprises the PVOH/PVAm copolymer.

6. The composition according to claim 5, in which one or more than one of said receptive layers further comprises at least one polymer selected from the group consisting of gelatin, starch, styrene butadiene rubber latex, homopolymers and copolymers of (meth)acrylic acid esters, polyacrylic acid, nitrile butadiene rubber latex, polyethylene glycol, polyacrylamide, polyvinyl alcohol, polyurethane latexes and dispersions, vinyl alcohol/vinyl acetate copolymer, polyalkyl oxazoline, polyphenyl oxazoline, polyethyleneimines, methyl cellulose, hydroxymethyl cellulose, hydroxyethyl cellulose, hydroxypropy methyl cellulose, hydroroxypropyl ethyl cellulose, hydroxyethyl methyl cellulose, carboxymethyl cellulose, poly(N-vinyl heterocycles) such as poly(N-vinyl pyrrolidone), (co)polymers of linear poly(N-vinylamides), (co)polymers of polyvinylamine and cationic polymers.

7. The composition according to claim 5 which further comprises a barrier layer between the support and the ink receptive layer or layers.

8. The composition according to claim 3 which comprises a support, at least one ink jet ink receptive layer, and a protective coating layer, wherein said protective coating layer comprises the PVOH/PVAm copolymer.

9. The composition according to claim 5 which comprises a protective coating layer.

10. The composition according to claim 5 which comprises a protective coating layer, wherein said protective coating layer comprises the PVOH/PVAm copolymer.

11. The composition according to claim 7 which comprises a protective coating layer.

12. The composition according to claim 7 which comprises a protective coating layer, wherein said protective coating layer comprises the PVOH/PVAm copolymer.

13. The composition according to claim 3 which further comprises ink jet ink.

14. The composition according to claim 3 which further comprises one or more pigments, fillers or organic particulates selected from the group consisting of amorphous silica, crystalline silica, aluminum trihydrate, kaolin, talcum, chalk, betonite, zeolite, glass beads, calcium carbonate, potassium sodium aluminum silicate, diatomaceous earth, silicates of aluminum, silicates of magnesium, titanium doxide, polyolefins, polystyrene, polyurethane, starch, poly(methyl methacrylate) and polytetrafluoroethylene.

15. The composition according to claim 3 which further comprises one or more additives selected from the group consisting of surface active agents, antistatic agents, thickeners, suspending agents, pH controlling compounds, light stabilizers, antioxidants, humectants, bacteriostats, crosslinking agents and optical brighteners.

16. The composition according to claim 15 in which the additives are selected from the group consisting of phenolic antioxidants, hydroxybenzotriazole ultraviolet light absorbers, benzophenone ultraviolet light absorbers, hydroxyphenyltriazine ultraviolet light absorbers and hindered amine light stabilizers.

17. The composition according to claim 3 in which said support comprises cellulose esters, cellulose acetate, polyesters, polystyrene, polyethylene, poly(vinyl acetate), polypropylene, polycarbonate, polymethacrylic acid and methyl and ethyl esters, polyamides such as nylons, polyesters such as poly(ethylene terephthalate) (PET), polyimides, polyethers, polyvinyl chloride, polytetrafluoroethylene, polyvinylidene fluoride or polysulfonamides.

18. The composition according to claim 3 in which said support is paper or transparent poly(ethylene) terephthalate.

19. An ink jet ink which comprises the PVOH/PVAm copolymer according to claim 1.

* * * * *